United States Patent
Zhou et al.

(10) Patent No.: US 12,185,296 B2
(45) Date of Patent: Dec. 31, 2024

(54) SHARED COMMON BEAM UPDATE ACROSS MULTIPLE COMPONENT CARRIERS

(71) Applicant: QUALCOMM Incorporated, San Diego, CA (US)

(72) Inventors: Yan Zhou, San Diego, CA (US); Tianyang Bai, Somerville, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 507 days.

(21) Appl. No.: 17/365,879

(22) Filed: Jul. 1, 2021

(65) Prior Publication Data
US 2022/0007347 A1 Jan. 6, 2022

Related U.S. Application Data

(60) Provisional application No. 63/047,878, filed on Jul. 2, 2020.

(51) Int. Cl.
*H04W 72/044* (2023.01)
(52) U.S. Cl.
CPC .................. *H04W 72/046* (2013.01)
(58) Field of Classification Search
None
See application file for complete search history.

(56) References Cited

U.S. PATENT DOCUMENTS

| 2019/0141691 A1* | 5/2019 | Kwon | H04W 72/12 |
| 2019/0261379 A1* | 8/2019 | Yerramalli | H04W 72/541 |
| 2019/0312698 A1 | 10/2019 | Akkarakaran et al. | |
| 2020/0100219 A1* | 3/2020 | Takeda | H04W 72/23 |

(Continued)

FOREIGN PATENT DOCUMENTS

| WO | 2019195528 A1 | 10/2019 | |
| WO | WO-2021149265 A1 * | 7/2021 | H04B 7/0456 |
| WO | WO-2021253055 A2 * | 12/2021 | H04B 7/0695 |

OTHER PUBLICATIONS

U.S. Appl. No. 63/035,378, filed Year: 2020.*

(Continued)

*Primary Examiner* — Joseph E Avellino
*Assistant Examiner* — Charles E Eckholdt
(74) *Attorney, Agent, or Firm* — Loza & Loza, LLP

(57) ABSTRACT

A base station and a UE may communicate using directional beams, such as a downlink directional beam (used to transmit downlink channels) and an uplink directional beam (used to transmit uplink channels), each beam carrying one or more data channels, control channels, and/or reference signals. According to one aspect, signaling for managing the uplink channels and downlink channels may be sent over a shared common beam. The shared common beam is distinct from the uplink directional beam and the downlink directional beam. In one example, a first shared common channel may serve to manage or update uplink data channels (on the uplink directional beam) and downlink data channels (on the downlink directional beam), while a second shared common channel may serve to manage or update uplink control channels (on the uplink directional beam) and downlink control channels (on the downlink directional beam).

27 Claims, 11 Drawing Sheets

(56) References Cited

U.S. PATENT DOCUMENTS

| | | | |
|---|---|---|---|
| 2020/0119869 A1 | 4/2020 | Taherzadeh Boroujeni et al. | |
| 2021/0314953 A1* | 10/2021 | Park | H04W 76/11 |
| 2021/0337547 A1* | 10/2021 | Rahman | H04W 72/046 |
| 2021/0385807 A1* | 12/2021 | Rahman | H04B 7/0802 |
| 2022/0015082 A1* | 1/2022 | Farag | H04L 69/40 |
| 2022/0116183 A1* | 4/2022 | Gao | H04L 1/1812 |
| 2022/0159772 A1* | 5/2022 | Raghavan | H04L 5/0085 |
| 2023/0104029 A1* | 4/2023 | Matsumura | H04B 7/0617 |
| | | | 370/329 |
| 2023/0110967 A1* | 4/2023 | Sun | H04B 7/0628 |
| | | | 370/329 |
| 2023/0156485 A1* | 5/2023 | Zhang | H04L 5/0051 |
| | | | 370/329 |
| 2023/0189284 A1* | 6/2023 | Cheng | H04L 5/0023 |
| | | | 370/329 |

OTHER PUBLICATIONS

Apple Inc: "On Further MIMO Enhancement", 3GPP Draft, 3GPP TSG RAN WG1 #100b, R1-2004234, 3rd Generation Partnership Project (3GPP), Mobile Competence Centre, 650, Route Des Lucioles, F-06921, Sophia-Antipolis Cedex, France, vol. RAN WG1, No. e-Meeting, May 25, 2020-Jun. 5, 2020, May 16, 2020 (May 16, 2020), XP051885989, 10 pages, Retrieved from the Internet : URL: https://ftp.3gpp.org/tsg_ran/WG1_RL1/TSGR1_101-e/Docs/R1-2004234.zip [retrieved on May 16, 2020] p. 4.

Huawei, et al., "Enhancements on Multi-Beam Operation", 3GPP Draft, 3GPP TSG RAN WG1 Meeting #98, R1-1908067, 3rd Generation Partnership Project (3GPP), Mobile Competence Centre, 650, Route Des Lucioles, F-06921 Sophia-Antipolis Cedex, France, vol. RAN WG1, No. Prague, Czech Republic, Aug. 26, 2019-Aug. 30, 2019, Aug. 17, 2019 (Aug. 17, 2019), XP051764690, 20 Pages, Retrieved from the Internet: URL: http://www.3gpp.org/ftp/tsg_ran/WG1_RL1/TSGR1_98/Docs/R1-1908067.zip [retrieved on Aug. 17, 2019] The Whole Document, Paragraph NPL Cite No. 2—[02.4], p. 4-p. 6, Table 1, chapter 2.4, p. 5.

International Search Report and Written Opinion—PCT/US2021/040310—ISA/EPO—Oct. 8, 2021.

* cited by examiner

SHARED COMMON BEAM UPDATE ACROSS MULTIPLE COMPONENT CARRIERS

CROSS-REFERENCE TO RELATED APPLICATIONS

The application claims priority to and the benefit of U.S. provisional patent application No. 63/047,878 filed on Jul. 2, 2020, the entire content of which is incorporated herein by reference as if fully set forth below in its entirety and for all applicable purposes.

TECHNICAL FIELD

The technology discussed below relates generally to wireless communication networks, and more particularly, to a shared common beam used for channel management of uplink and downlink beams in wireless communication networks.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power).

In a 5G New Radio (NR) wireless communication system, one or more base stations (e.g., an access points or gNodeBs) may wirelessly communicate with one or more user equipment (UE) (e.g., a smartphone). A UE may communicate with a base station via downlink channel and an uplink channel. The downlink channel refers to the communication link from the base station to the UE, and the uplink channel refers to the communication link from the UE to the base station.

The Third Generation Partnership Project (3GPP) has defined a set of standards for 5G NR designed to enhance support for mobile broadband Internet access by improving spectral efficiency, lower costs, improve services, making use of new spectrum, and better integrating with other open standards using orthogonal frequency division multiplexing (OFDM) with a cyclic prefix (CP) on the downlink (DL) and on the uplink (UL) as well as supporting beamforming, multiple-input multiple-output (MIMO) antenna technology, and carrier aggregation.

Massive MIMO antennas are used to facilitate beamforming, which allows the formation of a relatively narrow beam which directs transmissions to a particular direction where a UE is located thereby improving the quality of communications. A base station and a UE can perform analog beamforming to realize a narrow beam with a low radio frequency (RF) link cost.

However, as the demand for mobile broadband access continues to increase, there exists a need for further improvements in NR technology.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

One aspect provides a method operational at a base station for managing uplink and downlink channels using a shared common beam. The base station may establish a downlink directional beam for downlink channel transmissions to a user equipment (UE). The base station may also establish an uplink directional beam for uplink channel transmissions from the UE. The base station may also establish a shared common beam between the base station and the UE. An uplink channel and a downlink channel, at least two uplink channels, and/or at least two downlink channels, may be concurrently controlled or updated using the shared common beam. In one example, concurrently controlling or updating each uplink channel and each downlink channel using the shared common beam may include sending a single transmission via the shared common beam to update the UE as to which uplink channel and downlink channel should be used by the UE.

In one example, each downlink channel may include at least one of: a physical downlink control channel (PDCCH), a physical downlink scheduling channel (PDSCH), a channel status information reference signal (CSI-RS), and a positioning reference signal (PRS). In some instances, the CR-RS in the downlink channel may serve as a path loss reference signal (PLRS) or a tracking reference signal (TRS).

In some implementations, each uplink channel may include at least one of: a physical uplink control channel (PUCCH), a physical uplink scheduling channel (PUSCH), a physical random access channel (PRACH), and a sounding reference signal (SRS). In some instances, the SRS in the downlink channel may serve for uplink sounding of codebook, non-codebook based transmissions, device positioning, and/or antenna switching.

In some implementations, a plurality of shared common beams may be established between the base station and the UE, each shared common beam being individually identifiable by a unique beam identifier.

According to one feature, the shared common beam may be used for a PDSCH transmission. The UE may identify the shared common beam used for a PDSCH transmission based on the scheduling DCI and whether the scheduling offset between the PDSCH and the scheduling DCI is larger than a predefined threshold timeDurationForQCL. If the scheduling offset is larger than the threshold, then the UE uses the shared common beam indicated in (or identified by) the DCI. Otherwise, the UE may use a predefined default shared common beam to receive the PDSCH transmission. The default shared common beam may be the shared common beam with the smallest beam identifier (e.g., beam ID value).

Similarly, the UE may use the shared common beam to transmit PUCCH, PUSCH, and/or SRS. If the spatial relation information or uplink Transmission Configuration Indicator (TCI) state is configured for the scheduled PUCCH, PUSCH, and/or SRS, the UE may transmit using the shared common beam indicated in the spatial relation information or uplink TCI state. Otherwise, the UE may use a beam corresponding to a default shared common beam. The default shared common beam may be a common beam with smallest beam identifier (e.g., beam ID value).

In one example, the base station may transmit a message via the shared common beam indicating for the UE to use:

(a) a first shared common beam for management of the uplink transmissions, and (b) a second shared common beam for management of the downlink transmissions. In another example, the base station may transmit a message via the shared common beam indicating for the UE to use: (a) a first shared common beam for uplink and downlink data transmissions, and (b) a second shared common beam for uplink and downlink control transmissions. In yet another example, the base station may transmit a message via the shared common beam indicating for the UE to use: (a) a first shared common beam for management of uplink and downlink data channel transmissions, and (b) a second shared common beam for management of uplink and downlink control channel transmissions. The first shared common beam used for uplink and downlink control channel transmissions may have a first beam width, and the second shared common beam used for uplink and downlink data channel transmissions may have a second beam width, where the first bandwidth is wider than the second bandwidth.

In some implementations, the base station may send a beam identifier for the shared common beam to the UE using one of: a radio resource control (RRC), medium access control (MAC) control element (CE), or a downlink control indicator (DCI).

In various examples, the shared common beam is assigned a first beam identifier, and the first beam identifier is mapped to at least one of: (a) a downlink beam identifier associated with the downlink directional beam; (b) an uplink beam identifier associated with the uplink directional beam; or (c) a reference signal identifier.

In one implementation, the base station may assign the shared common beam a beam identifier. The beam identifier may be associated with a resource group that defines one or more resources utilized between the base station and the UE. The base station may then notify the UE of the resource group associated with the beam identifier. In one example, the base station may update the UE of a change in the resource group by one of either: (a) sending a new beam identifier for a different shared common beam now associated with the resource group, or (b) sending a new resource group identifier associated with the shared common beam.

According to one aspect, a plurality of component carriers (CCs) may be used to transmit one or more channels in each of the uplink directional beam and downlink directional beam. The shared common beam may be associated with all of the plurality of CCs.

The base station may also maintain a component carrier (CC) list for bandwidth parts transmitted between the base station and the UE. A beam identifier for the shared common beam may be associated with at least one component carrier in the component carrier list.

In one example, a message may be transmitted by the base station to the UE via the shared common channel indicating to the UE to update a shared common beam configuration associated with at least one of the CCs of the list, which causes the UE to use the updated shared common beam configuration for all CCs in the list.

Another aspect provides a method operational at a user equipment for using a shared common beam to manage uplink and downlink channels. The UE may receive establish a downlink directional beam for downlink channel transmissions from a base station. The UE may also establish an uplink directional beam for uplink channel transmissions to the base station. The UE may also establish a shared common beam between the base station and the UE. The UE may receive signals, from the base station, within the shared common beam that concurrently control or update: (a) an uplink channel and a downlink channel, (b) at least two uplink channels, and/or (c) at least two downlink channels. In one example, receiving signals from within the shared common beam may include receiving a single transmission via the shared common beam that update the UE as to which uplink channel and downlink channel should be used by the UE. In some implementations, each downlink channel may include at least one of: a physical downlink control channel (PDCCH), a physical downlink scheduling channel (PDSCH), a channel status information reference signal (CSI-RS), and a positioning reference signal (PRS). Additionally, each uplink channel includes at least one of: a physical uplink control channel (PUCCH), a physical uplink scheduling channel (PUSCH), a physical random access channel (PRACH), and a sounding reference signal (SRS). In some instances, the CR-RS in the downlink channel may serve as a path loss reference signal (PLRS) or a tracking reference signal (TRS). In other instances, the SRS in the downlink channel may serve for uplink sounding of codebook, non-codebook based transmissions, device positioning, and/or antenna switching.

According to one feature, the base station may transmit a PDSCH transmission to the UE based on a scheduling downlink control indicator (DCI), and depending on whether a scheduling offset between the PDSCH transmission and the scheduling DCI is greater than a predefined threshold, where if the shared common beam is indicated by DCI then the shared common beam is used for the PDSCH transmission if the scheduling offset is larger than the predefined threshold, and a default shared common beam is used for the PDSCH transmission otherwise.

Yet another feature provides for allocating the shared common beam to transmit a PUCCH transmission, a PUSCH transmission, or a SRS transmission from the UE to the base station depending on scheduling by a spatial relation information or transmission configuration indicator (TCI), where the shared common beam is used for the PUCCH transmission, the PUSCH transmission, or the SRS transmission if the shared common beam is indicated in the spatial relation information or TCI, otherwise, a default shared common beam is used for the PUCCH transmission, the PUSCH transmission, or the SRS transmission.

A plurality of shared common beams may also be established between the base station and the UE, each shared common beam being individually identifiable by a unique beam identifier. The UE may receive a message via the shared common beam indicating the UE to use: (a) a first shared common beam for management of the uplink transmissions, and (b) a second shared common beam for management of the downlink transmissions. The UE may also receive a message via the shared common beam indicating for the UE to use: (a) a first shared common beam for uplink and downlink data transmissions, and (b) a second shared common beam for uplink and downlink control transmissions. In yet another example, the UE may also receive a message via the shared common beam indicating for the UE to use: (a) a first shared common beam for management of uplink and downlink data channel transmissions, and (b) a second shared common beam for management of uplink and downlink control channel transmissions. In one implementation, the first shared common beam used for uplink and downlink control channel transmissions may have a first beam width, and the second shared common beam used for uplink and downlink data channel transmissions may have a second beam width, where the first bandwidth is wider than the second bandwidth.

The UE may also receive a beam identifier for the shared common beam to the UE using one of: a radio resource control (RRC), medium access control (MAC) control element (CE), or a downlink control indicator (DCI).

In some implementations, the shared common beam may be assigned a first beam identifier, and the first beam identifier is mapped to at least one of: (a) a downlink beam identifier associated with the downlink directional beam; (b) an uplink beam identifier associated with the uplink directional beam; or (c) a reference signal identifier.

According to one feature, the UE may receive an indication of a beam identifier the shared common beam, the beam identifier associated with a resource group, wherein the resource group defines one or more resources utilized between the base station and the UE.

In one example, receiving, from the base station, an indication to change a resource group may include one of either: (a) receiving a new beam identifier for a different shared common beam now associated with the resource group, or (b) receiving a new resource group identifier associated with the shared common beam.

In some implementations, a plurality of component carriers (CCs) may be used to transmit one or more channels in each of the uplink directional beam and downlink directional beam, and the shared common beam is associated with all of the plurality of CCs.

The UE may maintain a component carrier (CC) list for bandwidth parts transmitted between the base station and the UE. A beam identifier for the shared common beam may be associated with at least one component carrier in the component carrier list based on an indication from the base station. A message also be received from the base station via the shared common channel indicating to the UE to update a shared common beam configuration associated with at least one of the CCs of the list, which causes the UE to use the updated shared common beam configuration for all CCs in the list.

These and other aspects will become more fully understood upon a review of the detailed description, which follows. Other aspects, features, and embodiments will become apparent to those of ordinary skill in the art, upon reviewing the following description of specific, exemplary embodiments of in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments, such exemplary embodiments can be implemented in various devices, systems, and methods.

DETAILED DESCRIPTION

Figure 1:
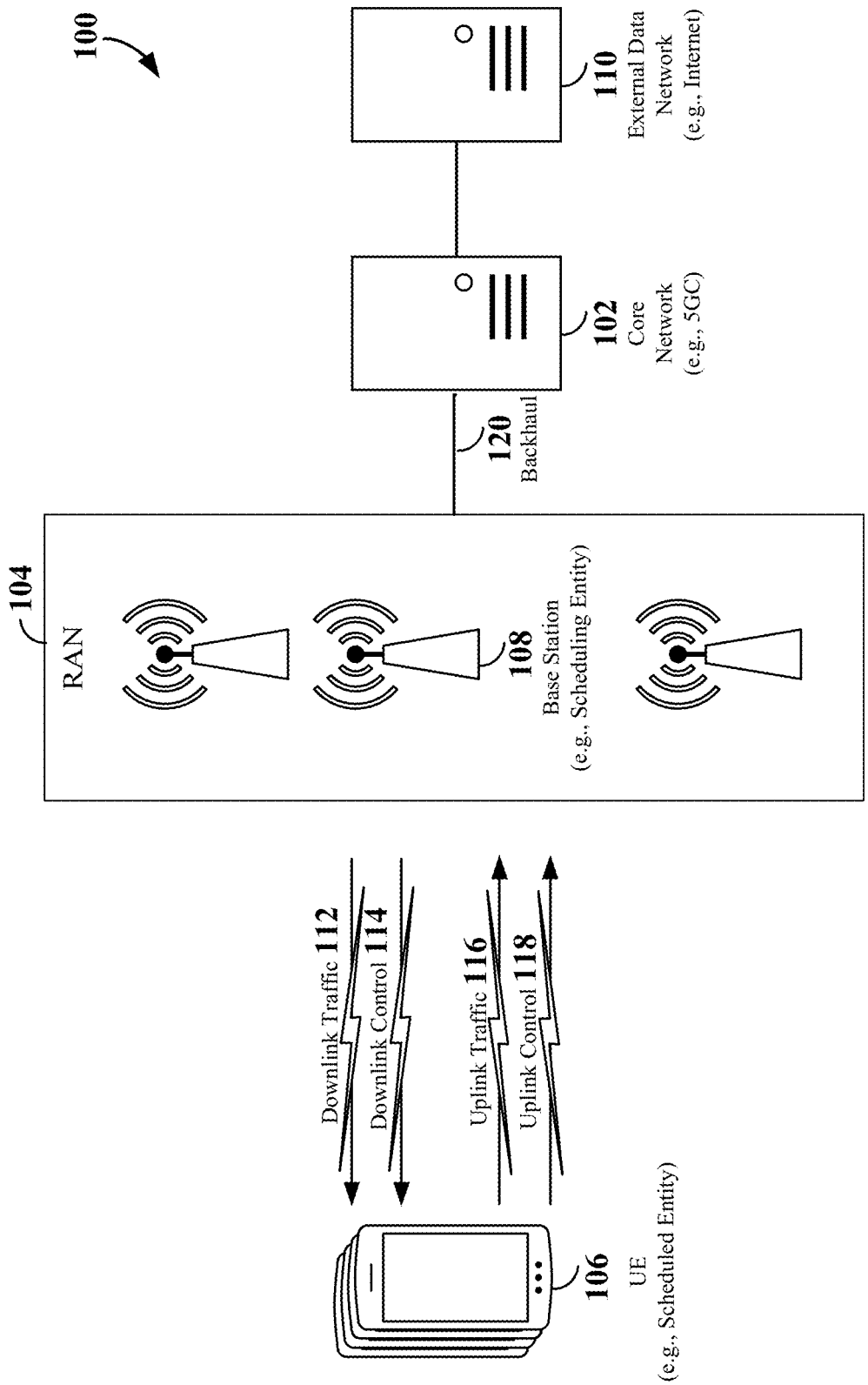
FIG. 1 is a schematic illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

In current 5G NR communication networks, uplink channels and downlink channels are controlled by separate control channels, which are susceptible to latency. A base station and a UE may communicate using directional beams, such as a downlink directional beam (used to transmit downlink channels) and an uplink directional beam (used to transmit uplink channels), each beam carrying one or more data channels, control channels, and/or reference signals. According to one aspect, signaling for managing the uplink channels and downlink channels may be sent over a shared common beam. The shared common beam is distinct from the uplink directional beam and the downlink directional beam. In one example, a first shared common channel may serve to manage or update uplink data channels (on the uplink directional beam) and downlink data channels (on the downlink directional beam), while a second shared common channel may serve to manage or update uplink control channels (on the uplink directional beam) and downlink control channels (on the downlink directional beam).

The advantage of using a shared common channel to manage channels in both the uplink directional beam and the downlink directional beam is that it may reduce latency and also reduce overhead. That is, overhead may be reduced by avoiding the use of separate control channels for the uplink channels and downlink channels. Additionally, the use of a shared common channel may also serve to reduce latency in managing and/or updating uplink and downlink channels.

Various aspects of the present disclosure may be practiced within a 5G NR communication network. The electromagnetic spectrum for such networks may be subdivided by into different classes, bands, channels, or the like, based on frequency/wavelength. For example, in 5G NR two initial operating bands have been identified as frequency range designations FR1 (410 MHz-7125 MHz) and FR2 (24250 MHz-52600 MHZ). Even though a portion of FR1 is greater than 6 GHz (>6000 MHz), FRI is often referred to (interchangeably) as a Sub-6 GHz band. A similar nomenclature issue sometimes occurs with regard to FR2 in various documents and articles regarding 5G NR topics. While a portion of FR2 is less than 30 GHZ (<30000 MHz), FR2 is often referred to (interchangeably) as a millimeter wave band. However, some have defined wireless signals with wavelengths between 1-10 millimeters as falling within a millimeter wave band (30 GHz-300 GHz).

With the above examples in mind, unless specifically stated otherwise, it should be understood that the term "sub-6 GHz" if used herein by way of example may represent all or part of FRI for 5G NR. Further, unless specifically stated otherwise, it should be understood that the term "millimeter wave" as used herein by way of example may represent all or part of FR2 for 5G NR and/or all or part of a 30 GHz-300 GHz waveband. It should also be understood that the terms "sub-6 GHz" and "millimeter wave," are intended to represent modifications to such example frequency bands that may occur due to author/entity decisions regarding wireless communications, e.g., as presented by example herein.

It should be understood that the above examples are not necessarily intended to limit claimed subject matter. For example, unless specifically recited, claimed subject matter relating to wireless communications is not necessarily intended to be limited to any particular author/entity defined frequency band, or the like.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of Things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station 108 (e.g., a scheduling entity) to one or more UEs (e.g., UE 106) may be referred to as downlink (DL) transmission. In accordance with certain aspects of the present disclosure, the term downlink may refer to a point-to-multipoint transmission originating at a base station 108 (e.g., scheduling entity). Another way to describe this scheme may be to use the term broadcast channel multiplexing. Transmissions from a UE (e.g., UE 106) to a base station 108 (e.g., scheduling entity) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a base station 108 (e.g., a scheduling entity) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the base station 108.

Base stations 108 are not the only entities that may function as scheduling entities. That is, in some examples, a UE may function as a scheduling entity, scheduling resources for one or more scheduled entities (e.g., one or more other UEs). And as discussed more below, UEs may communicate directly with other UEs in peer-to-peer fashion and/or in relay configuration.

As illustrated in FIG. 1, the base station 108 may broadcast downlink traffic 112 to one or more UEs 106 (e.g., scheduled entities). Broadly, the base station 108 may be a node or device responsible for scheduling traffic in a wireless communication network, including the downlink traffic 112 and, in some examples, uplink traffic 116 from one or more UEs 106 to the base station 108. On the other hand, the UE 106 may be a node or device that receives downlink control information 114, including but not limited to scheduling information (e.g., a grant), synchronization or timing information, or other control information from another entity in the wireless communication network such as the base station 108.

In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
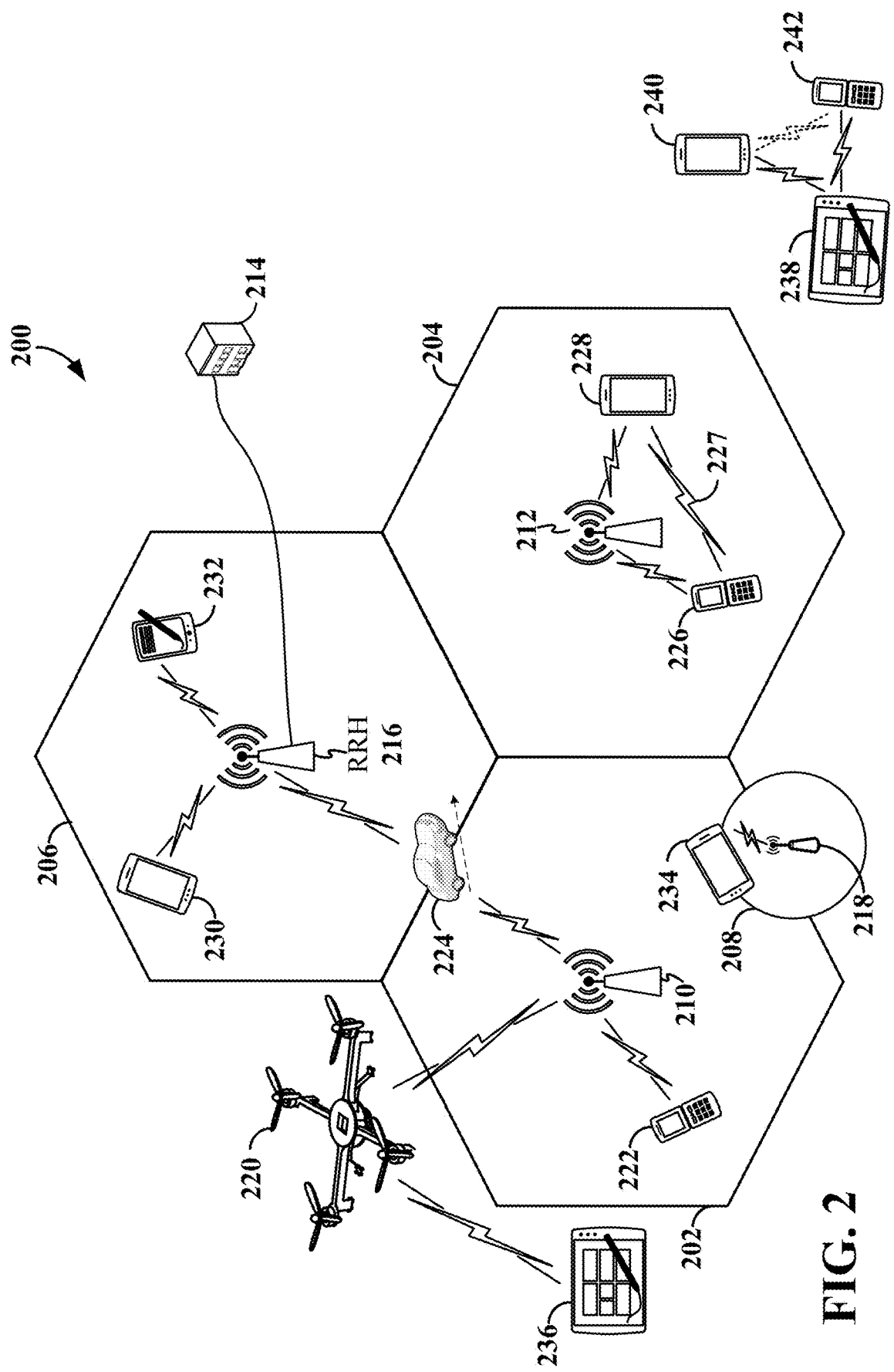
FIG. 2 is a conceptual illustration of an example of a radio access network according to some aspects.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 206 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

Within the RAN 200, the cells may include UEs that may be in communication with one or more sectors of each cell. Further, each base station 210, 212, 214, and 218 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; and UE 234 may be in communication with base station 218. In some examples, the UEs 222, 224, 226, 228, 230, 232, 234, 238, 240, and/or 242 may be the same as the UE/scheduled entity 106 described above and illustrated in FIG. 1.

In some examples, an unmanned aerial vehicle (UAV) 220, which may be a drone or quadcopter, can be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. Sidelink communication may be utilized, for example, in a device-to-device (D2D), peer-to-peer (P2P), vehicle-to-vehicle (V2V) network, and/or vehicle-to-everything (V2X). For example, two or more UEs (e.g., UEs 226 and 228) within the coverage area of a serving base station 212 may communicate with each other using sidelink signals 227 without relaying that communication through the base station. In this example, the base station 212 or one or both of the UEs 226 and 228 may function as scheduling entities to schedule sidelink communication between UEs 226 and 228. In some examples, the sidelink signals 227 include sidelink traffic and sidelink control. In a further example, UEs outside the coverage area of a base station may communicate over a sidelink carrier. For example, UE 238 is illustrated communicating with UEs 240 and 242. Here, the UE 238 may function as a scheduling entity or a transmitting sidelink device, and UEs 240 and 242 may each function as a scheduled entity or a receiving sidelink device.

In the RAN 200, the ability for a UE to communicate while moving, independent of its location, is referred to as mobility. The various physical channels between the UE and the RAN are generally set up, maintained, and released under the control of an access and mobility management function (AMF, not illustrated, part of the core network 102 in FIG. 1). In some scenarios, the AMF may include a security context management function (SCMF) and a security anchor function (SEAF) that performs authentication. The SCMF can manage, in whole or in part, the security context for both the control plane and the user plane functionality.

In some examples, the RAN 200 may enable mobility and handovers (i.e., the transfer of a UE's connection from one radio channel to another). For example, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

The air interface in the radio access network 200 may further utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

Various aspects of the present disclosure will be described with reference to an OFDM waveform, schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 3:
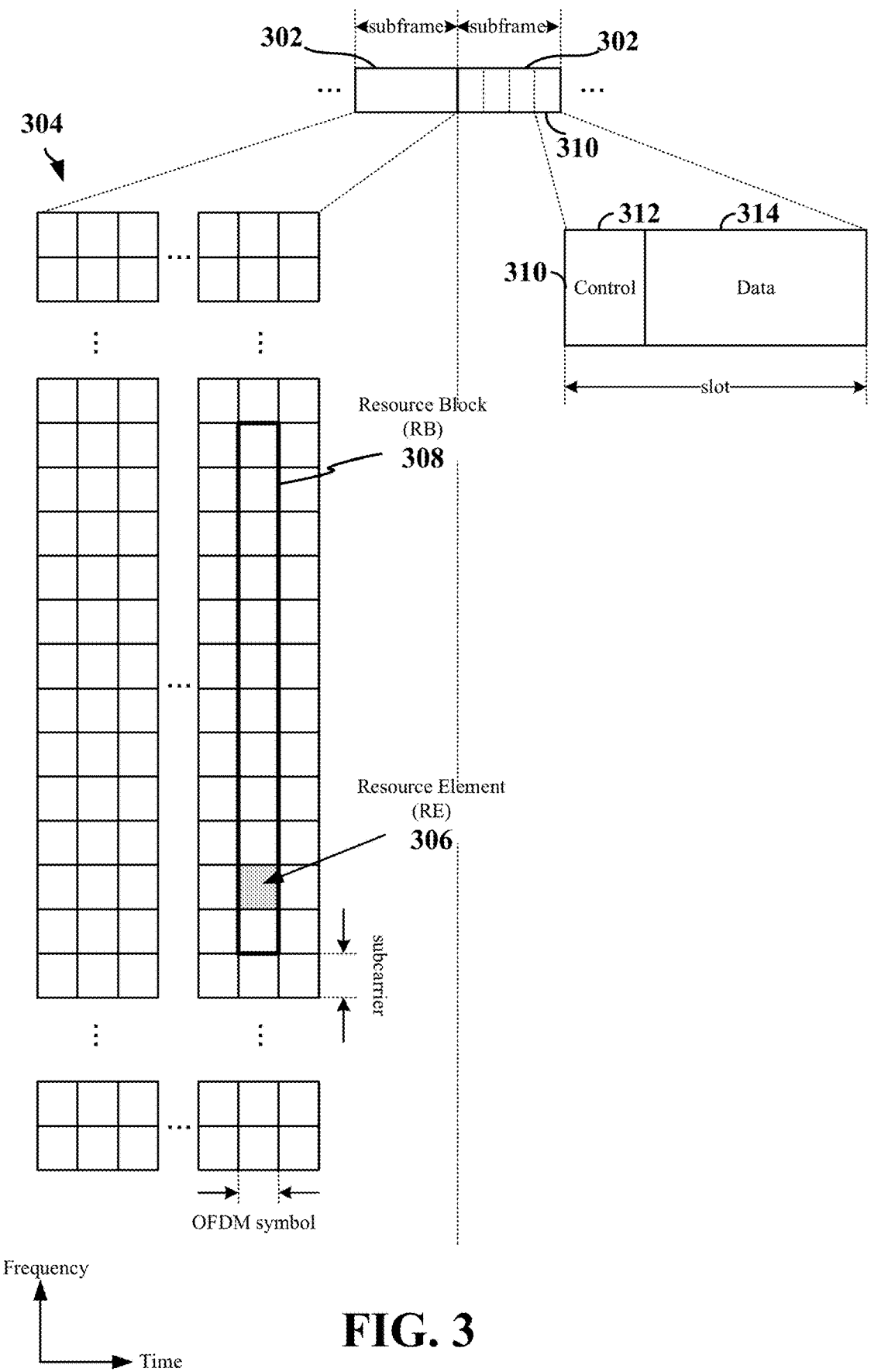
FIG. 3 is a diagram illustrating an example of a frame structure for use in a radio access network according to some aspects.

Referring now to FIG. 3, an expanded view of an exemplary DL subframe 302 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier x 1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

Scheduling of UEs (e.g., scheduled entities) for downlink or uplink transmissions typically involves scheduling one or more resource elements 306 within one or more sub-bands. Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The structure illustrated in FIG. 3 is merely exemplary in nature, and different slot structures may be utilized, and may include one or more of each of the control region(s) and data region(s).

In some examples, the slot 310 may be utilized for broadcast or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 306 (e.g., within the control region 312) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 306 (e.g., in the control region 312 or the data region 314) to carry other DL signals, such as a demodulation reference signal (DMRS); a phase-tracking reference signal (PT-RS); a channel state information (CSI) reference signal (CSI-RS); a primary synchronization signal (PSS); and a secondary synchronization signal (SSS). A UE may utilize the PSS and SSS to achieve radio frame, subframe, slot, and symbol synchronization in the time domain, identify the center of the channel (system) bandwidth in the frequency domain, and identify the physical cell identity (PCI) of the cell. The synchronization signals PSS and SSS, and in some examples, the PBCH and a PBCH DMRS, may be transmitted in a synchronization signal block (SSB). The PBCH may further include a master information block (MIB) that includes various system information, along with parameters for decoding a system information block (SIB). The SIB may be, for example, a SystemInformationType1 (SIB1) that may include various additional system information. Examples of system information transmitted in the MIB may include, but are not limited to, a subcarrier spacing, system frame number, a configuration of a PDCCH control resource set (CORESET) (e.g., PDCCH CORESETO), and a search space for SIB1. Examples of additional system information transmitted in the SIB1 may include, but are not limited to, a random access search space, downlink configuration information, and uplink configuration information. The MIB and SIB1 together provide the minimum system information (SI) for initial access.

In an UL transmission, the scheduled entity (e.g., UE) may utilize one or more REs 306 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 306 (e.g., within the data region 314) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry other signals, such as one or more SIBs and DMRSs.

In an example of sidelink communication over a sidelink carrier via a PC5 interface, the control region 312 of the slot 310 may include a physical sidelink control channel (PSCCH) including sidelink control information (SCI) transmitted by an initiating (transmitting) sidelink device (e.g., V2X or other sidelink device) towards a set of one or more other receiving sidelink devices. The data region 314 of the slot 310 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 306 within slot 310. For example, HARQ feedback information may be transmitted in a physical sidelink feedback channel (PSFCH) within the slot 310 from the receiving sidelink device to the transmitting sidelink device. In addition, one or more reference signals, such as a sidelink SSB and/or a sidelink CSI-RS, may be transmitted within the slot 310.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers described above in connection with FIGS. 1-3 are not necessarily all of the channels or carriers that may be utilized between a scheduling entity and scheduled entities, and those of ordinary skill in the art will recognize that other channels or carriers may be utilized in addition to those illustrated, such as other traffic, control, and feedback channels.

Figure 4:
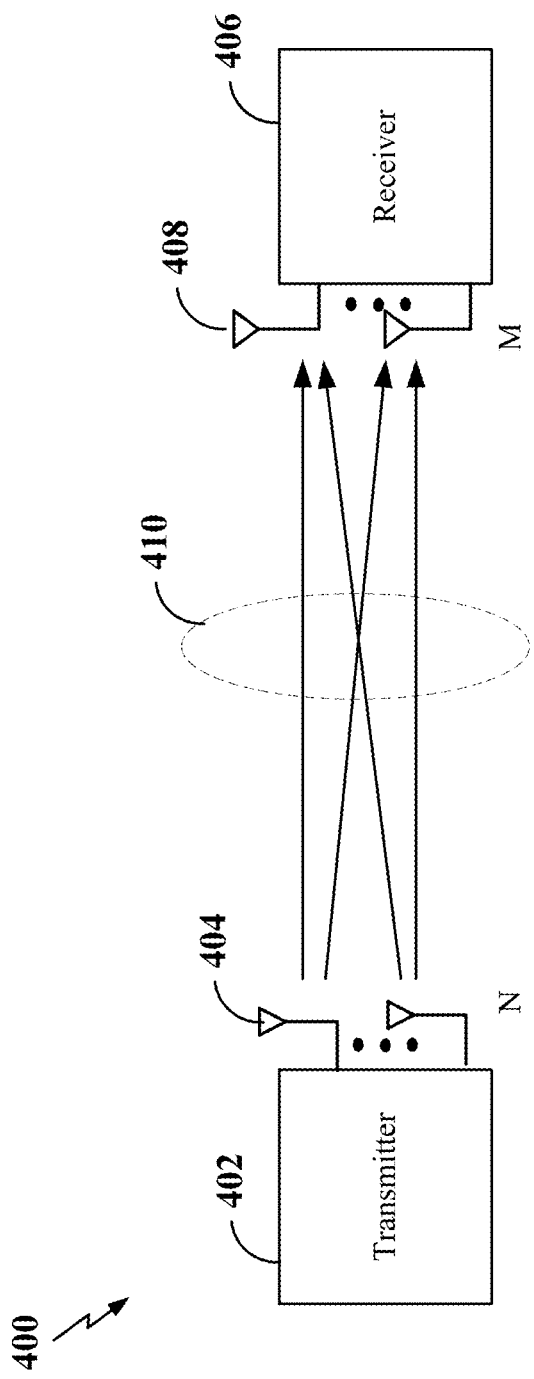
FIG. 4 is a block diagram illustrating a wireless communication system supporting beamforming and/or multiple-input multiple-output (MIMO) communication according to some aspects.

In some aspects of the disclosure, the base station (e.g., scheduling entity) and/or UD (e.g., scheduled entity) may be configured for beamforming and/or multiple-input multiple-output (MIMO) technology. FIG. 4 illustrates an example of a wireless communication system 400 supporting beamforming and/or MIMO. In a MIMO system, a transmitter 402 includes multiple transmit antennas 404 (e.g., N transmit antennas) and a receiver 406 includes multiple receive antennas 408 (e.g., M receive antennas). Thus, there are N×M signal paths 410 from the transmit antennas 404 to the receive antennas 408. Each of the transmitter 402 and the receiver 406 may be implemented, for example, within a scheduling entity, a scheduled entity, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system 400 is limited by the number of transmit or receive antennas 404 or 408, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-plus-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In one example, as shown in FIG. 4, a rank-2 spatial multiplexing transmission on a 2×2 MIMO antenna configuration will transmit one data stream from each transmit antenna 404. Each data stream reaches each receive antenna 408 along a different signal path 410. The receiver 406 may then reconstruct the data streams using the received signals from each receive antenna 408.

Beamforming is a signal processing technique that may be used at the transmitter 402 or receiver 406 to shape or steer an antenna beam (e.g., a transmit beam or receive beam)

along a spatial path between the transmitter 402 and the receiver 406. Beamforming may be achieved by combining the signals communicated via antennas 404 or 408 (e.g., antenna elements of an antenna array module) such that some of the signals experience constructive interference while others experience destructive interference. To create the desired constructive/destructive interference, the transmitter 402 or receiver 406 may apply amplitude and/or phase offsets to signals transmitted or received from each of the antennas 404 or 408 associated with the transmitter 402 or receiver 406.

In 5G New Radio (NR) systems, particularly for above 6 GHz or mmWave systems, beamformed signals may be utilized for most downlink channels, including the physical downlink control channel (PDCCH) and physical downlink shared channel (PDSCH). In addition, broadcast control information, such as the SSB, slot format indicator (SFI), and paging information, may be transmitted in a beam-sweeping manner to enable all scheduled entities (UEs) in the coverage area of a transmission and reception point (TRP) (e.g., a gNB) to receive the broadcast control information. In addition, for UEs configured with beamforming antenna arrays, beamformed signals may also be utilized for uplink channels, including the physical uplink control channel (PUCCH) and physical uplink shared channel (PUSCH). However, it should be understood that beamformed signals may also be utilized by enhanced mobile broadband (eMBB) gNBs for sub-6 GHz systems.

Figure 5:
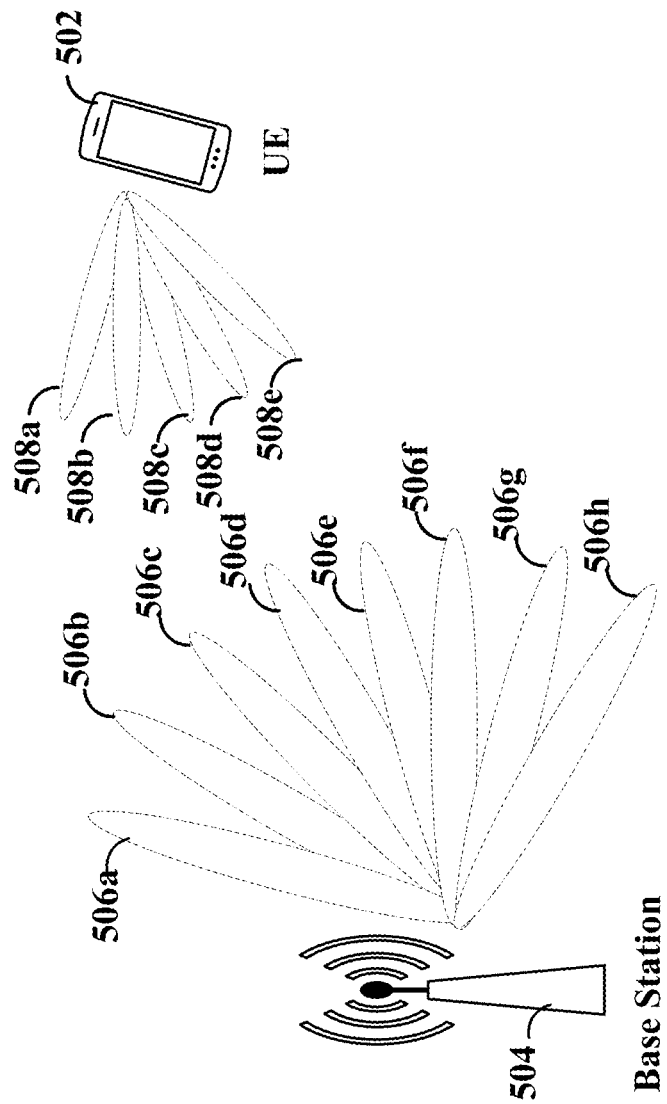
FIG. 5 is a diagram illustrating an example of communication between a base station and a user equipment (UE) using beamforming according to some aspects.

FIG. 5 is a diagram illustrating communication between a base station 504 and a UE 502 using beamformed signals according to some aspects. The base station 504 may be any of the base stations (e.g., gNBs) or scheduling entities illustrated in FIGS. 1 and/or 2, and the UE 502 may be any of the UEs or scheduled entities illustrated in FIGS. 1 and/or 2.

In the example shown in FIG. 5, the base station 504 is configured to generate a plurality of beams 506a-506h, each associated with a different beam direction. In addition, the UE 502 is configured to generate a plurality of beams 508a-508e, each associated with a different beam direction. The base station 504 and UE 502 may select one or more beams 506a-506h on the base station 504 and one or more beams 508a-508e on the UE 502 for communication of uplink and downlink signals therebetween.

In an example, the base station 504 may be configured to sweep or transmit on each of a plurality of downlink transmit beams 506a-506h during one or more synchronization slots. For example, the base station 504 may transmit a reference signal, such as an SSB or CSI-RS, on each beam in the different beam directions during the synchronization slot. Transmission of the beam reference signals may occur periodically (e.g., as configured via radio resource control (RRC) signaling by the gNB), semi-persistently (e.g., as configured via RRC signaling and activated/deactivated via medium access control-control element (MAC-CE) signaling by the gNB), or aperiodically (e.g., as triggered by the gNB via downlink control information (DCI)). It should be noted that while some beams are illustrated as adjacent to one another, such an arrangement may be different in different aspects. For example, downlink transmit beams 506a-506h transmitted during a same symbol may not be adjacent to one another. In some examples, the base station 504 may transmit more or less beams distributed in all directions (e.g., 360 degrees).

In addition, the UE 502 is configured to receive the downlink beam reference signals on a plurality of downlink receive beams 508a-508e. In some examples, the UE 502 searches for and identifies each of the downlink transmit beams 506a-506h based on the beam reference signals. The UE 502 then performs beam measurements (e.g., reference signal received power (RSRP), SINR, reference signal received quality (RSRQ), etc.) on the beam reference signals to determine the respective beam quality of each of the downlink transmit beams 506a-506h as measured on each of the downlink receive beams 508a-508e.

The UE 502 can generate and transmit a Layer 1 (L1) measurement report, including the respective beam identifier (beam index) and beam measurement of one or more of the downlink transmit beams 506a-506h to the base station 504. The base station 504 may then select one or more downlink transmit beams on which to transmit unicast downlink control information and/or user data traffic to the UE 502. In some examples, the selected downlink transmit beam(s) have the highest gain from the L1 measurement report. In some examples, the UE 502 can further identify the downlink transmit beams selected by the base station from the beam measurements. Transmission of the L1 measurement report may occur periodically (e.g., as configured via RRC signaling by the gNB), semi-persistently (e.g., as configured via RRC signaling and activated/deactivated via MAC-CE signaling by the gNB), or aperiodically (e.g., as triggered by the gNB via DCI).

The base station 504 or the UE 502 may further select a corresponding downlink receive beam on the UE 502 for each selected serving downlink transmit beam to form a respective downlink beam pair link (BPL) for each selected serving downlink transmit beam. For example, the UE 502 can utilize the beam measurements to select the corresponding downlink receive beam for each serving downlink transmit beam. In some examples, the selected downlink receive beam to pair with a particular downlink transmit beam may have the highest gain for that particular downlink transmit beam.

In other examples, when the channel is reciprocal (e.g., the downlink and uplink channel qualities are the same), the base station 504 may derive a downlink transmit beam. Derivation of the downlink transmit beam can be based on uplink measurements performed by the base station 504, such as by measuring the received power, quality, or other variable on the plurality of base station beams 506a-506h of a sounding reference signal (SRS) or other uplink reference signal transmitted by the UE 502 on one or more of the UE beams 508a-508e. In some examples, the base station 504 may derive the downlink beam based on a combination of the L1 measurement report and uplink measurements.

In one example, a first downlink directional beam 506d may be selected for downlink channel transmissions from the base station 504 to the UE 502. Similarly, a first uplink directional beam 508c may be selected for uplink channel transmissions from the UE 502 to the base station 504. The base station 504 may control all scheduling of transmissions over the downlink channel(s) and the uplink channel(s).

To update, modify, and/or change the configuration of the uplink channel(s) or downlink channel(s), the base station may use control mechanisms, such as RRC, to inform the UE 502 of any changes. However, each uplink channel and downlink channel have dedicated RRCs, which adds to overhead and latency. That is, the use of dedicated RRCs to control each channel adds to overhead transmissions and, depending on resource scheduling, the use of RRCs may also add to latency.

One aspect provides for using a shared common beam to concurrently control and/or update the uplink channel (over the uplink directional beam) and the downlink channel (over the downlink directional beam). That is, rather than using other control mechanisms transmitted within the uplink directional beam and/or the downlink directional beam, the shared common beam may serve to transmit updates of resources and/or channel configurations for the channels in the uplink and downlink directional beams.

Figure 6:
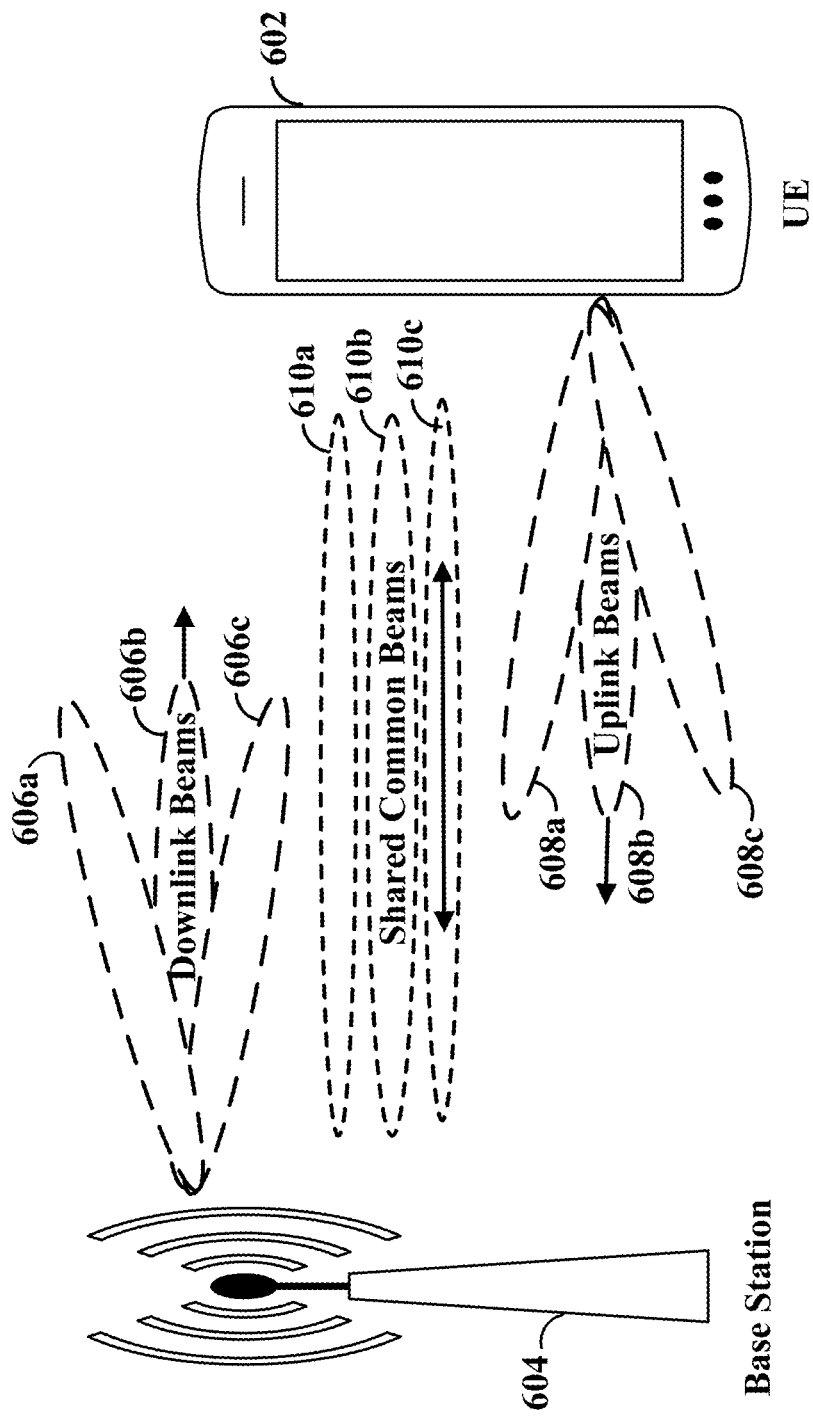
FIG. 6 is a diagram illustrating a wireless communication system including a shared common beam between a base station and a UE that serves to manage channels in downlink beams and uplink beams according to some aspects.

FIG. 6 is a diagram illustrating a wireless communication system including a shared common beam between a base station 604 and a UE 602 that serves to manage channels in downlink beams and uplink beams according to some aspects. In this example, one or more downlink channel(s) from the base station 604 to the UE 602 may be transmitted over one or more downlink directional beams 606a, 606b, and 606c. The one or more downlink channel(s) may include a physical downlink control channel (PDCCH), a physical downlink scheduling channel (PDSCH), a channel status information reference signal (CSI-RS), and a positioning reference signal (PRS). Similarly, one or more uplink channel(s) from the UE 602 to the base station 604 may be transmitted over one or more uplink directional beams 608a, 608b, and 608c. The one or more uplink channel(s) may include a physical uplink control channel (PUCCH), a physical uplink scheduling channel (PUSCH), a physical random access channel (PRACH), and a sounding reference signal (SRS). One or more shared common beams 610a, 610b, and 610c may allow the base station 604 to update, control, and/or manage one or more downlink channels and uplink channels in the downlink directional beams 606a, 606b, 606c, and the uplink directional beams 608a, 608b, 608c, respectively. That is, the use of shared common beams to manage at least one uplink directional beam and at least one downlink directional beam combines beam control into a single resource, which can be scheduled more regularly than other update mechanisms, thereby decreasing latency. In various examples, one or more shared common beams may be used to transmit messages, indicators, and/or configurations to the UE 602. For instance, a first shared common beam may be used for management of uplink and downlink data transmissions (over uplink and downlink data channels), and a second shared common beam may be used for management of uplink and downlink control transmissions (over uplink and downlink control channels).

Figure 7:
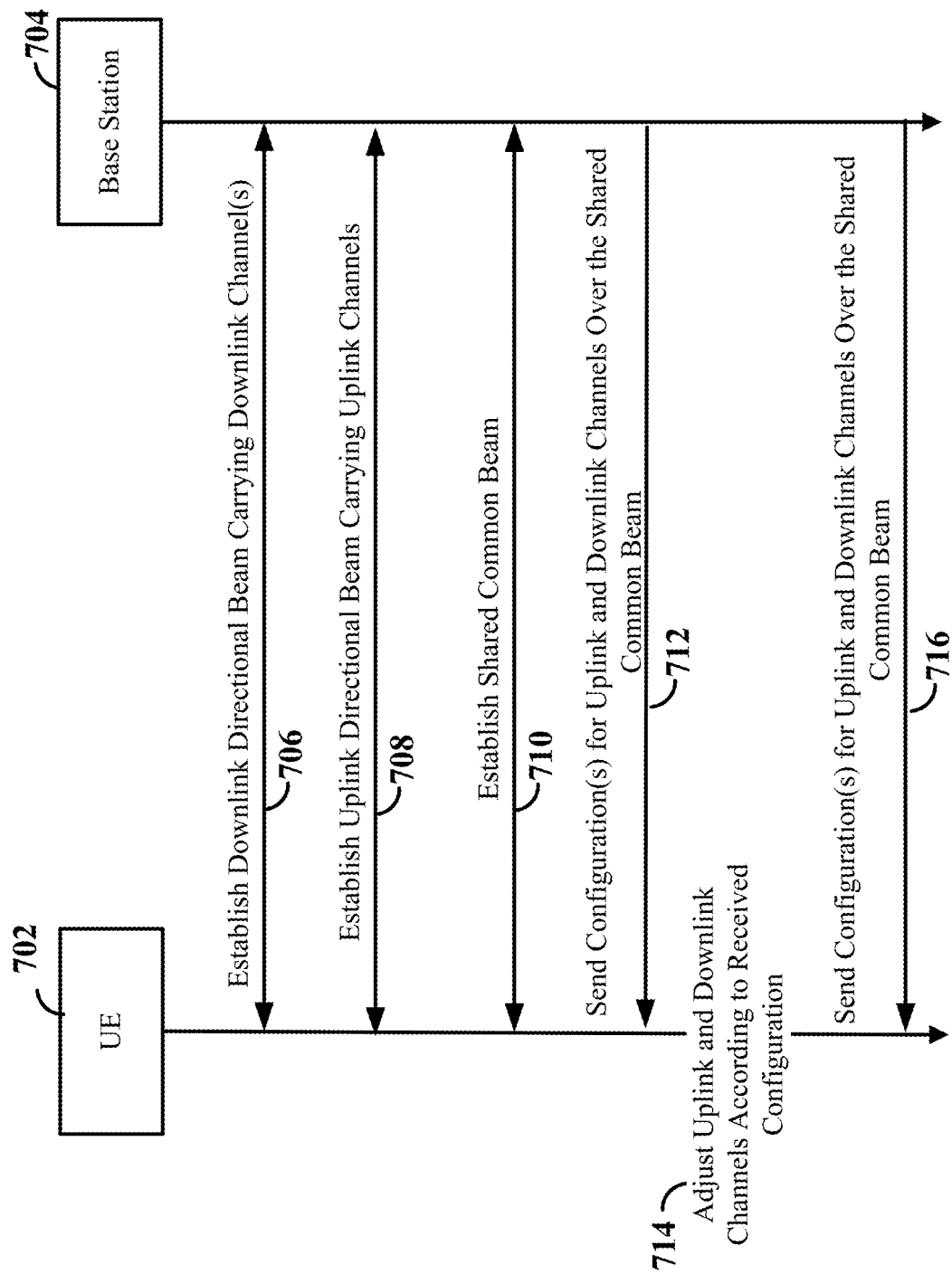
FIG. 7 illustrates an example of concurrently managing uplink and downlink channels using a shared common beam between a base station and an UE.

FIG. 7 illustrates an example of concurrently managing uplink and downlink channels using a shared common beam between a base station 704 and an UE 702. The UE 702 may correspond to any of the UEs or scheduled entities shown in FIGS. 1, 2, 4, 5, and/or 6. In addition, the base station 704 may correspond to any of the base stations or scheduling entities shown in FIGS. 1, 2, 4, 5, and/or 6.

The base station 704 may establish a downlink directional beam 706 to the UE 702, the downlink directional beam carrying one or more downlink channels. In one example, this may be performed by the base station performing a beam sweep to transmit a reference signal (e.g., an SSB or CSI-RS) on each of a plurality of downlink transmit beams to the UE 702. The UE 702 identifies and measures the RSRP or other suitable beam measurement of a respective beam reference signal transmitted on each downlink transmit beam. For example, the UE 702 may measure the RSRP on each downlink receive beam of the UE for each downlink transmit beam from the base station 704. In addition, the UE 702 may transmit an L1 measurement report, including the beam measurements, to the base station 704. The base station 704 may then select one or more serving downlink transmit beams on which to transmit unicast downlink control information and/or user data traffic to the UE 702. In some examples, the selected serving downlink transmit beam(s) (e.g., downlink directional beam) may have the highest gain from the L1 measurement report.

In some implementations, the UE 702 may form downlink BPLs between the serving downlink transmit beams and serving downlink receive beams. In some examples, the UE 702 may select a corresponding serving downlink receive beam for each selected serving downlink transmit beam to form the downlink BPLs. For example, the UE 702 can identify the serving downlink transmit beams (e.g., the downlink transmit beams with the highest gain, where the number of downlink transmit beams is known based on, for example, UE capabilities). The UE 702 can then select the corresponding downlink receive beam for each serving downlink transmit beam based on the beam measurements. In some examples, the selected downlink receive beam to pair with a particular downlink transmit beam may have the highest gain for that particular downlink transmit beam.

Similarly, the UE 702 may also establish an uplink directional beam 708 to the base station 704, the uplink directional beam carrying one or more uplink channels. In one example, this may be done by the UE 702 performing a beam sweep to transmit a reference signal (e.g., an SRS) on each of a plurality of uplink transmit beams to the base station 704. The base station 704 identifies and measures the RSRP or other suitable beam measurement of a respective beam reference signal transmitted on each uplink transmit beam. For example, the UE 702 may measure the RSRP on each downlink receive beam of the UE for each downlink transmit beam from the base station 704. In addition, the base station 704 may transmit a measurement report, including the beam measurements, to the UE 702. The UE 702 may then select one or more serving downlink transmit beams on which to transmit unicast uplink data traffic to the base station 704. In some examples, the selected serving uplink transmit beam(s) (e.g., uplink directional beam) may have the highest gain from the measurement report.

The base station 704 may also establish one or more shared common beams 710 with the UE 702, through which the base station 704 can manage downlink channels and uplink channels carried by the downlink beam and uplink beam, respectively. The base station 704 may establish the one or more shared common beams 710 by a method similar to that for establishing the downlink transmit beam(s). For instance, the base station 704 may send configuration, update, and/or control information/signaling 712 for the downlink and uplink channels to the UE 702. In turn, the UE 702 may adjust its uplink and downlink beams and/or uplink and downlink channels according to the received configuration, update, and/or control information/signaling 714. The base station 704 may periodically or aperiodically send configuration messages 716 to manage, control, and/or update the uplink and downlink channels over the shared common beam.

Figure 8:
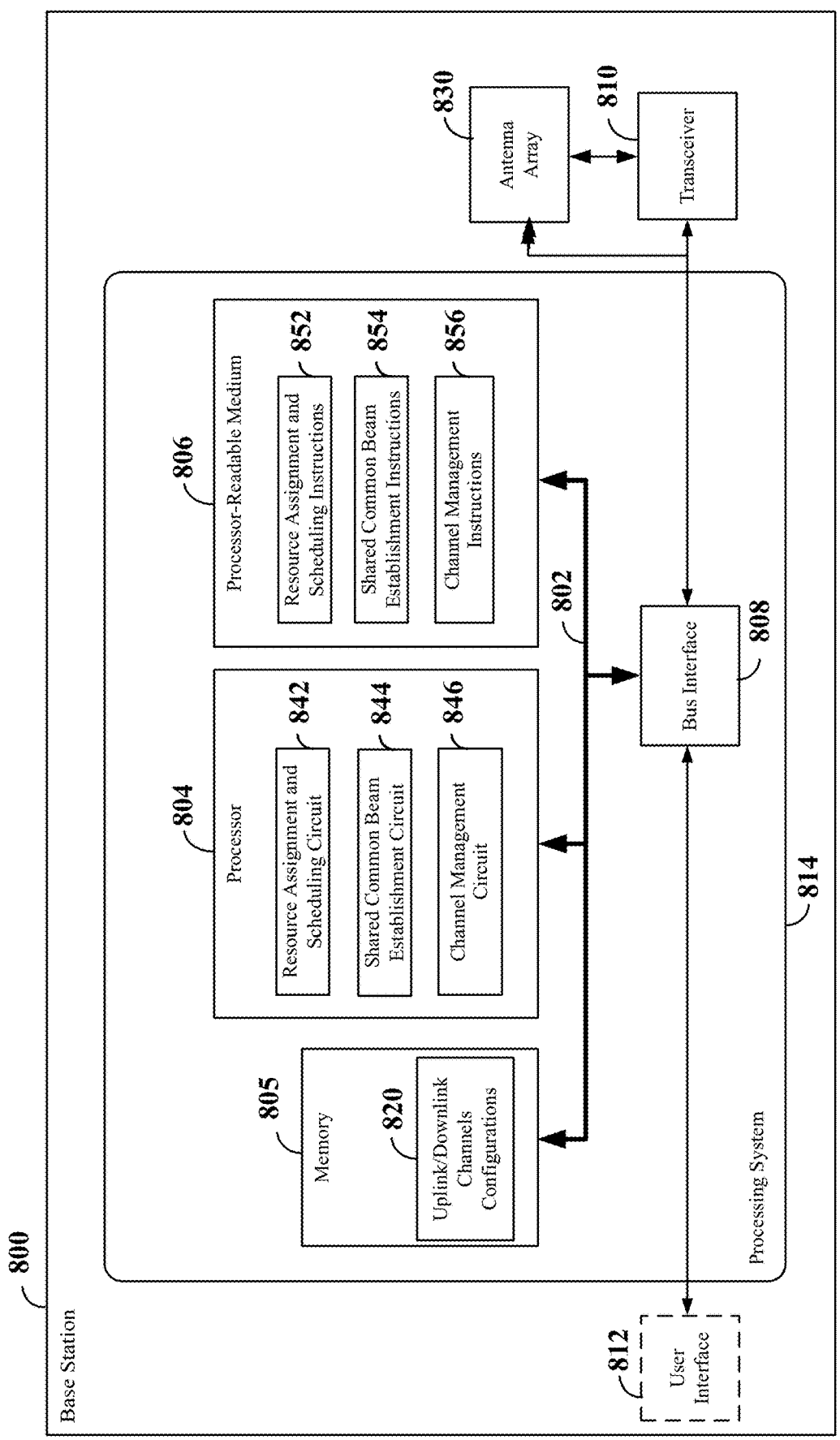
FIG. 8 is a conceptual diagram illustrating an example of a hardware implementation for an exemplary base station employing a processing system.

FIG. 8 is a conceptual diagram illustrating an example of a hardware implementation for an exemplary base station 800 employing a processing system 814. For example, the base station 800 may be any of the base stations or scheduling entities illustrated in any one or more of FIGS. 1, 2, and/or 5-7.

In accordance with various aspects of the disclosure, an element, or any portion of an element, or any combination of elements may be implemented with a processing system 814 that includes one or more processors 804. The processing system 814 may include a bus interface 808, a bus 802, memory 805, a processor 804, and a processor-readable medium 806. Furthermore, the base station 800 may include an optional user interface 812 and a transceiver 810. That is, the processor 804, as utilized in a base station 800, may be used to implement any one or more of the processes described below.

In some aspects of the disclosure, the processor 804 may include circuitry configured for various functions. For example, the processor 804 may include resource assignment and scheduling circuitry 842, configured to generate, schedule, and modify a resource assignment or grant of time-frequency resources (e.g., a set of one or more resource elements). For example, the resource assignment and scheduling circuitry 842 may schedule time-frequency resources within a plurality of time division duplex (TDD) and/or frequency division duplex (FDD) subframes, slots, and/or mini-slots to carry user data traffic and/or control information to and/or from multiple UEs over uplink channels and downlink channels.

In some examples, the resource assignment and scheduling circuitry 842 may be configured to schedule resources for downlink channels (over downlink beams) and uplink channels (over uplink beams) to/from a UE. The uplink/downlink channel configurations 820 may be stored, for example, in memory 805. In some examples, the uplink/downlink channel configurations 820 may be transmitted via, for example, a shared common beam.

The resource assignment and scheduling circuit 842 may further be configured to execute resource assignment and scheduling instructions 852 stored on the processor-readable medium 806 to implement one or more of the functions described herein.

The processor 804 may further include a shared common beam establishment circuit 844, configured to setup a directional beam between the base station 800 and the UE. The shared common beam establishment circuit 844 may further be configured to generate and transmit beamformed signals via the transceiver 810 and an antenna array 830.

The shared common beam establishment circuit 844 may further be configured to execute shared common beam establishment instructions 854 stored on the processor-readable medium 806 to implement one or more of the functions described herein.

The processor 804 may further include a channel management circuit 846, configured to manage uplink channels (on an uplink beam) and downlink channels (on a downlink beam) using the shared common beam. The channel management circuit 846 may further be configured to operate together with the resource assignment and scheduling circuit 842 to update and/or manage the configuration of one or more uplink channels (transmitted over an uplink beam) and one or more downlink channels (transmitted over a downlink beam) over the shared common beam. The channel management circuit 846 may further be configured to execute channel management instructions 856 stored on the processor-readable medium 806 to implement one or more of the functions described herein.

Figure 9:
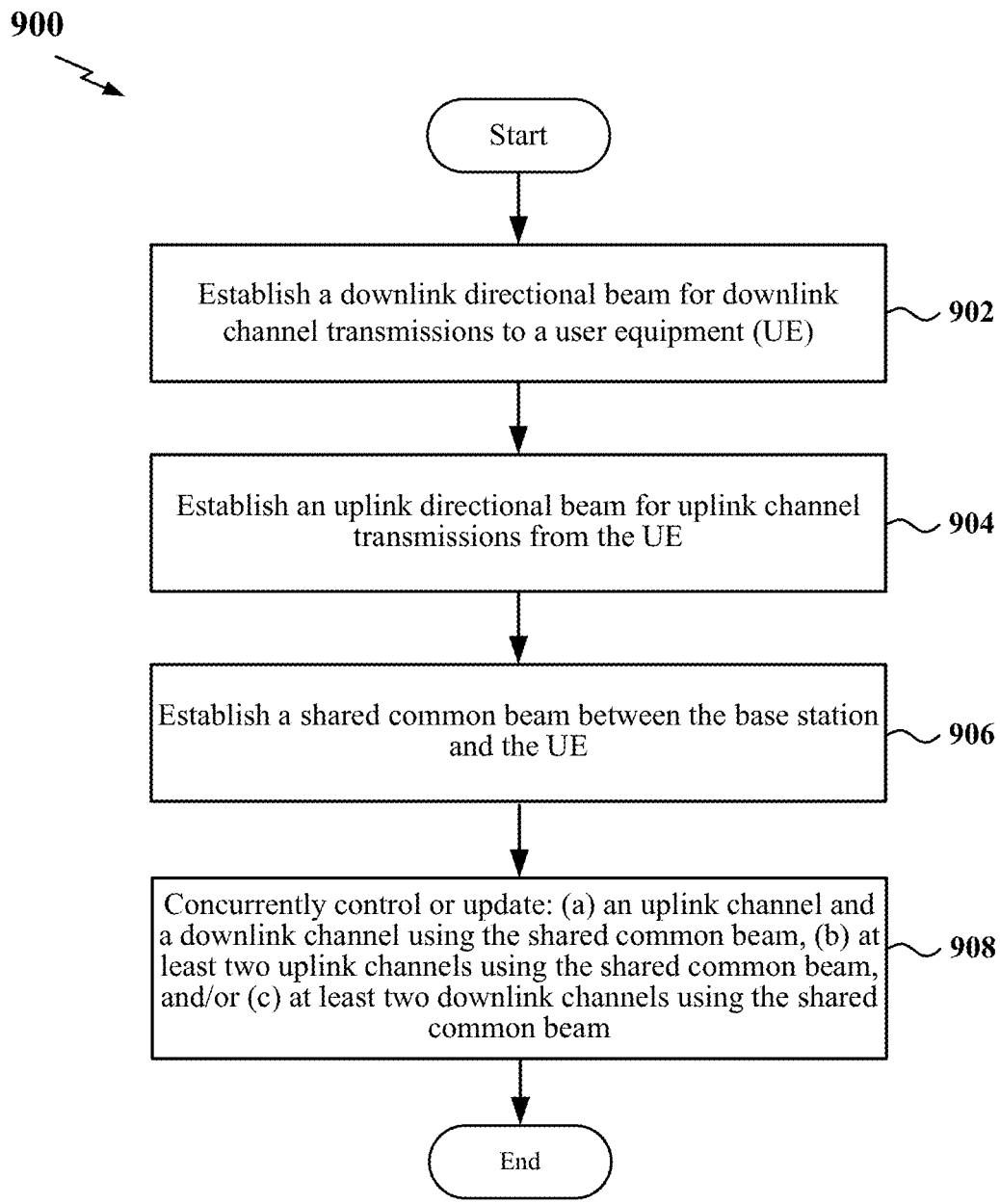
FIG. 9 is a flow chart illustrating an example of a method for using a shared common beam to manage channels in an uplink beam and a downlink beam according to some aspects.

FIG. 9 is a flow chart 900 illustrating an example of a method for using a shad common beam to manage channels in an uplink beam and a downlink beam according to some aspects. As described below, some or all illustrated features may be omitted in a particular implementation within the scope of the present disclosure, and some illustrated features may not be required for implementation of all embodiments. In some examples, the method may be performed by the base station 800, as described above and illustrated in FIG. 8, by a processor or processing system, or by any suitable means for carrying out the described functions.

At block 902, the base station may establish a downlink directional beam for downlink channel transmissions to a user equipment (UE).

At block 904, the base station may also establish an uplink directional beam for uplink channel transmissions from the UE.

At block 906, the base station may also establish a shared common beam between the base station and the UE.

At block 908, (a) an uplink channel and a downlink channel, (b) at least two uplink channels, (c) and/or at least two downlink channels, may be concurrently controlled or updated using the shared common beam. In one example, concurrently controlling or updating each uplink channel and/or each downlink channel using the shared common beam may include sending a single transmission via the shared common beam to update the UE as to which uplink channel and downlink channel (or configuration therein) should be used by the UE.

In one example, each downlink channel may include at least one of: a physical downlink control channel (PDCCH), a physical downlink scheduling channel (PDSCH), a channel status information reference signal (CSI-RS), and a positioning reference signal (PRS). In some instances, the CR-RS in the downlink channel may serve as a path loss reference signal (PLRS) or a tracking reference signal (TRS).

In some implementations, each uplink channel may include at least one of: a physical uplink control channel (PUCCH), a physical uplink scheduling channel (PUSCH), a physical random access channel (PRACH), and a sounding reference signal (SRS). In some instances, the SRS in the downlink channel may serve for uplink sounding of codebook, non-codebook based transmissions, device positioning, and/or antenna switching.

In some implementations, a plurality of shared common beams may be established between the base station and the UE, each shared common beam being individually identifiable by a unique beam identifier.

According to one feature, the shared common beam may be used for a PDSCH transmission. The UE may identify the shared common beam used for a PDSCH transmission based on the scheduling DCI and whether the scheduling offset between the PDSCH and the scheduling DCI is larger than a predefined threshold timeDurationForQCL. If the scheduling offset is larger than the threshold, then the UE uses the shared common beam indicated in (or identified by) the DCI. Otherwise, the UE may use a predefined default shared common beam to receive the PDSCH transmission. The default shared common beam may be the shared common beam with the smallest beam identifier (e.g., beam ID value).

Similarly, the UE may use the shared common beam to transmit PUCCH, PUSCH, and/or SRS. If the spatial relation information or uplink Transmission Configuration Indicator (TCI) state is configured for the scheduled PUCCH, PUSCH, and/or SRS, the UE may transmit using the shared common beam indicated in the spatial relation information or uplink TCI state. Otherwise, the UE may use a beam corresponding to a default shared common beam. The default shared common beam may be a common beam with smallest beam identifier (e.g., beam ID value).

In one example, the base station may transmit a message via the shared common beam indicating for the UE to use: (a) a first shared common beam for management of the uplink transmissions, and (b) a second shared common beam for management of the downlink transmissions. In another example, the base station may transmit a message via the shared common beam indicating for the UE to use: (a) a first shared common beam for uplink and downlink data transmissions, and (b) a second shared common beam for uplink and downlink control transmissions. In yet another example, the base station may transmit a message via the shared common beam indicating for the UE to use: (a) a first shared common beam for management of uplink and downlink data channel transmissions, and (b) a second shared common beam for management of uplink and downlink control channel transmissions. The first shared common beam used for uplink and downlink control channel transmissions may have a first beam width, and the second shared common beam used for uplink and downlink data channel transmissions may have a second beam width, where the first bandwidth is wider than the second bandwidth.

In some implementations, the base station may send a beam identifier for the shared common beam to the UE using one of: a radio resource control (RRC), medium access control (MAC) control element (CE), or a downlink control indicator (DCI).

In various examples, the shared common beam is assigned a first beam identifier, and the first beam identifier is mapped to at least one of: (a) a downlink beam identifier associated with the downlink directional beam; (b) an uplink beam identifier associated with the uplink directional beam; or (c) a reference signal identifier.

In one implementation, the base station may assign the shared common beam a beam identifier. The beam identifier may be associated to a resource group that defines one or more resources utilized between the base station and the UE. The base station may then notify the UE of the resource group associated with the beam identifier. In on example, the base station may update the UE of a change in the resource group by one of either: (a) sending a new beam identifier for a different shared common beam now associated with the resource group, or (b) sending a new resource group identifier associated with the shared common beam.

According to one aspect, a plurality of component carriers (CCs) may be used to transmit one or more channels in each of the uplink directional beam and downlink directional beam. The shared common beam may be associated with all of the plurality of CCs.

The base station may also maintain a component carrier (CC) list for bandwidth parts transmitted between the base station and the UE. A beam identifier for the shared common beam may be associated with at least one component carrier in the component carrier list.

In one example, a message may be transmitted by the base station to the UE via the shared common channel indicating to the UE to update a shared common beam configuration associated with at least one of the CCs of the list, which causes the UE to use the updated shared common beam configuration for all CCs in the list.

In one configuration, the UE 800 includes means for performing the various functions and processes described in relation to FIG. 8. In one aspect, the aforementioned means may be the processor 804 shown in FIG. 8 configured to perform the functions recited by the aforementioned means. In another aspect, the aforementioned means may be a circuit or any apparatus configured to perform the functions recited by the aforementioned means.

Of course, in the above examples, the circuitry included in the processor 804 is merely provided as an example, and other means for carrying out the described functions may be included within various aspects of the present disclosure, including but not limited to the instructions stored in the processor-readable storage medium 806, or any other suitable apparatus or means described in any one of the FIGS. 1, 2, and/or 4-8, and utilizing, for example, the processes and/or algorithms described herein in relation to FIG. 9.

Figure 10:
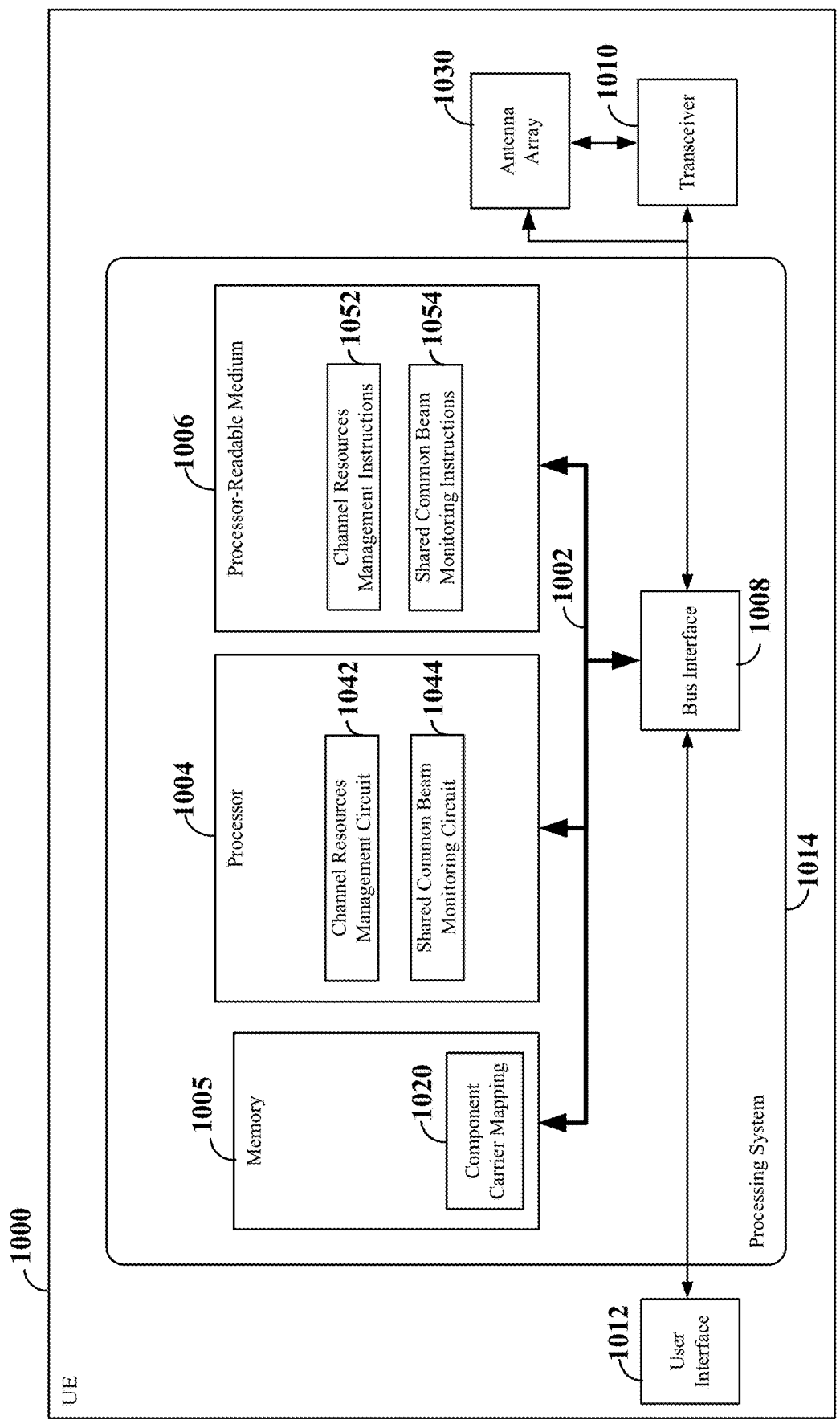
FIG. 10 is a conceptual diagram illustrating an example of a hardware implementation for an exemplary UE employing a processing system.

FIG. 10 is a conceptual diagram illustrating an example of a hardware implementation for an exemplary UE 1000 employing a processing system 1014. For example, the UE 1000 may be any of the UEs or scheduled entities illustrated in any one or more of FIGS. 1, 2, and/or 4-9.

The UE 1000 may be implemented with a processing system 1014 that includes one or more processors 1004. Examples of processors 1004 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the UE 1000 may be configured to perform any one or more of the functions described herein. That is, the processor 1004, as utilized in a UE 1000, may be used to implement any one or more of the processes described below in connection with FIG. 10.

The processor 1004 may in some instances be implemented via a baseband or modem chip and in other implementations, the processor 1004 may itself comprise a number of devices distinct and different from a baseband or modem chip (e.g., in such scenarios is may work in concert to achieve embodiments discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1014 may be implemented with a bus architecture, represented generally by the bus 1002. The bus 1002 may include any number of interconnecting buses and bridges depending on the specific application of the processing system 1014 and the overall design constraints. The bus 1002 communicatively couples together various circuits including one or more processors (represented generally by the processor 1004), a memory 1005, and computer-readable media (represented generally by the processor-readable medium 1006). The bus 1002 may also link various other circuits such as timing sources, peripherals, voltage regulators, and power management circuits, which are well known in the art, and therefore, will not be described any further. A bus interface 1008 provides an interface between the bus 1002 and a transceiver 1010. The transceiver 1010 provides a means for communicating with various other apparatus over a transmission medium (e.g., air interface). A user interface 1012 (e.g., keypad, display, speaker, microphone, joystick) may also be provided.

The processor 1004 is responsible for managing the bus 1002 and general processing, including the execution of instructions stored on the processor-readable medium 1006. The instructions, when executed by the processor 1004, causes the processing system 1014 to perform the various functions described below for any particular apparatus. The processor-readable medium 1006 and the memory 1005 may also be used for storing data that is manipulated by the processor 1004 when executing instructions.

One or more processors 1004 in the processing system may execute instructions. Such instructions shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a processor-readable medium 1006.

The processor-readable medium 1006 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The processor-readable medium 1006 may reside in the processing system 1014, external to the processing system 1014, or distributed across multiple entities including the processing system 1014. The processor-readable medium 1006 may be embodied in a computer program product. In some examples, the processor-readable medium 1006 may be part of the memory 1005. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the processor 1004 may include circuitry configured for various functions. For example, the processor 1004 may include a channel resources management circuit 1042, configured to manage information and/or configuration of uplink and downlink channels to/from the UE. In some examples, the channel resources management circuit 1042 may include one or more hardware components that provide the physical structure that performs processes related to wireless communication (e.g., signal reception and/or signal transmission) and signal processing (e.g., processing a received signal and/or processing a signal for transmission).

In some examples, the channel resources management circuit 1042 may be configured to receive and process downlink beamformed signals via the transceiver 1010 and an antenna array 1030. For example, the channel resources management circuit 1042 may be configured to receive a respective reference signal (e.g., SSB or CSI-RS) on one or more downlink beams from the base station for channel state information (CSI) feedback in accordance with a CSI report setting and associated CSI resource setting.

The channel resources management circuit 1042 may further be configured to execute channel resources management instructions 1052 stored on the processor-readable medium 1006 to implement one or more of the functions described herein.

The processor 1004 may further include a shared common beam monitoring circuit 1044, configured to monitor one or more shared common beams (and/or channels carried thereon) between the UE 1000 and the base station. The shared common beam monitoring circuit 1044 may further be configured to maintain a component carrier (CC) mapping between component carriers and beam identifiers. The shared common beam monitoring circuit 1044 may further be configured to execute shared common beam monitoring instructions 1054 stored on the processor-readable medium 1006 to implement one or more of the functions described herein.

Figure 11:
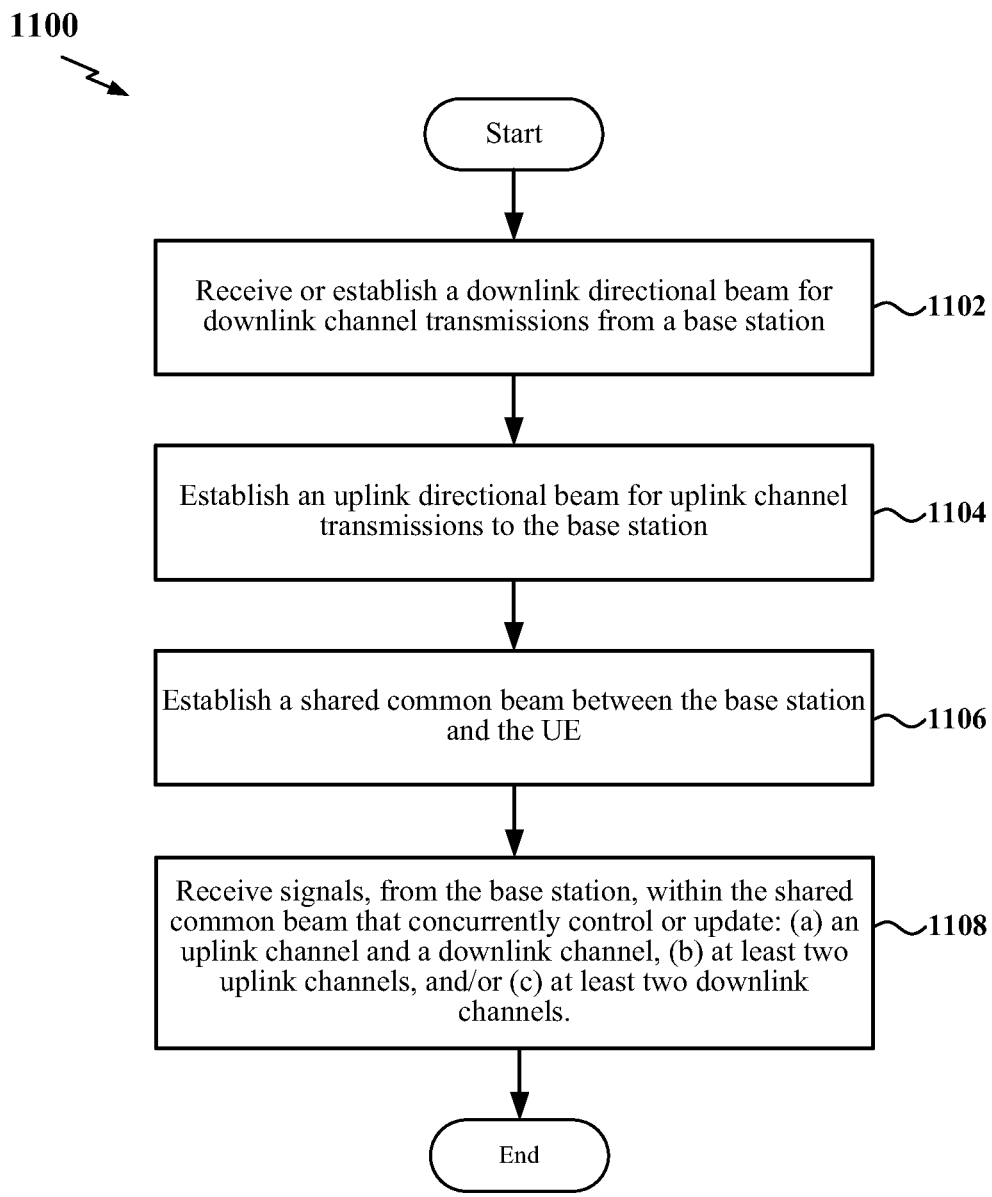
FIG. 11 is a flow chart illustrating an example of a method for using a shared common beam to manage channels in an uplink beam and a downlink beam according to some aspects.

FIG. 11 is a flow chart 1100 illustrating an example of a method for using a shared common beam to manage channels in an uplink beam and a downlink beam according to some aspects. As described below, some or all illustrated features may be omitted in a particular implementation within the scope of the present disclosure, and some illustrated features may not be required for implementation of all embodiments. In some examples, the method may be performed by the UE 1000, as described above and illustrated in FIG. 10, by a processor or processing system, or by any suitable means for carrying out the described functions.

At block 1102, the UE may receive or establish a downlink directional beam for downlink channel transmissions from a base station.

At block 1104, the UE may also establish an uplink directional beam for uplink channel transmissions to the base station.

At block 1106, the UE may also establish a shared common beam between the base station and the UE.

At block 1108, the UE may receive signals, from the base station, within the shared common beam that concurrently control or update: (a) an uplink channel and a downlink channel, (b) at least two uplink channels, (c) and/or at least two downlink channels. In one example, receiving signals from within the shared common beam may include receiving a single transmission via the shared common beam that update the UE as to which uplink channel and downlink channel should be used by the UE. In some implementations, each downlink channel may include at least one of: a physical downlink control channel (PDCCH), a physical downlink scheduling channel (PDSCH), a channel status information reference signal (CSI-RS), and a positioning reference signal (PRS). Additionally, each uplink channel includes at least one of: a physical uplink control channel (PUCCH), a physical uplink scheduling channel (PUSCH), a physical random access channel (PRACH), and a sounding reference signal (SRS). In some instances, the CR-RS in the downlink channel may serve as a path loss reference signal (PLRS) or a tracking reference signal (TRS). In other instances, the SRS in the downlink channel may serve for uplink sounding of codebook, non-codebook based transmissions, device positioning, and/or antenna switching.

According to one aspect, the base station may transmit a PDSCH transmission to the UE based on a scheduling downlink control indicator (DCI), and depending on whether a scheduling offset between the PDSCH transmission and the scheduling DCI is greater than a predefined threshold, where if the shared common beam is indicated by DCI then the shared common beam is used for the PDSCH transmission if the scheduling offset is larger than the predefined threshold, and a default shared common beam is used for the PDSCH transmission otherwise.

Yet another aspect provides for allocating the shared common beam to transmit a PUCCH transmission, a PUSCH transmission, or a SRS transmission from the UE to the base station depending on scheduling by a spatial relation information or transmission configuration indicator (TCI), where the shared common beam is used for the PUCCH transmission, the PUSCH transmission, or the SRS transmission if the shared common beam is indicated in the spatial relation information or TCI, otherwise, a default shared common beam is used for the PUCCH transmission, the PUSCH transmission, or the SRS transmission.

A plurality of shared common beams may also be established between the base station and the UE, each shared common beam being individually identifiable by a unique beam identifier. The UE may receive a message via the shared common beam indicating the UE to use: (a) a first shared common beam for management of the uplink transmissions, and (b) a second shared common beam for management of the downlink transmissions. The UE may also receive a message via the shared common beam indicating for the UE to use: (a) a first shared common beam for uplink and downlink data transmissions, and (b) a second shared common beam for uplink and downlink control transmissions. In yet another example, the UE may also receive a message via the shared common beam indicating for the UE to use: (a) a first shared common beam for management of uplink and downlink data channel transmissions, and (b) a second shared common beam for management of uplink and downlink control channel transmissions. In one implementation, the first shared common beam used for uplink and downlink control channel transmissions may have a first beam width, and the second shared common beam used for uplink and downlink data channel transmissions may have a second beam width, where the first bandwidth is wider than the second bandwidth.

The UE may also receive a beam identifier for the shared common beam to the UE using one of: a radio resource control (RRC), medium access control (MAC) control element (CE), or a downlink control indicator (DCI).

In some implementations, the shared common beam may be assigned a first beam identifier, and the first beam identifier is mapped to at least one of: (a) a downlink beam identifier associated with the downlink directional beam; (b) an uplink beam identifier associated with the uplink directional beam; or (c) a reference signal identifier.

According to one aspect, the UE may receive an indication of a beam identifier the shared common beam, the beam identifier associated with a resource group, wherein the resource group defines one or more resources utilized between the base station and the UE.

In one example, receiving, from the base station, an indication to change a resource group may include one of either: (a) receiving a new beam identifier for a different shared common beam now associated with the resource group, or (b) receiving a new resource group identifier associated with the shared common beam.

In some implementations, a plurality of component carriers (CCs) may be used to transmit one or more channels in each of the uplink directional beam and downlink directional beam, and the shared common beam is associated with all of the plurality of CCs.

The UE may maintain a component carrier (CC) list for bandwidth parts transmitted between the base station and the UE. A beam identifier for the shared common beam may be associated with at least one component carrier in the component carrier list based on an indication from the base station. A message also be received from the base station via the shared common channel indicating to the UE to update a shared common beam configuration associated with at least one of the CCs of the list, which causes the UE to use the updated shared common beam configuration for all CCs in the list.

In one configuration, the UE 1000 includes means for performing the various functions and processes described in relation to FIG. 11. In one aspect, the aforementioned means may be the processor 1004 shown in FIG. 10 configured to perform the functions recited by the aforementioned means. In another aspect, the aforementioned means may be a circuit or any apparatus configured to perform the functions recited by the aforementioned means.

Of course, in the above examples, the circuitry included in the processor 1004 is merely provided as an example, and other means for carrying out the described functions may be included within various aspects of the present disclosure, including but not limited to the instructions stored in the processor-readable storage medium 1006, or any other suitable apparatus or means described in any one of the FIGS. 1, 2, and/or 4-10, and utilizing, for example, the processes and/or algorithms described herein in relation to FIG. 11.

The following provides an overview of aspects of the present disclosure:

Aspect 1: A method for wireless communications at a base station, comprising: establishing a downlink directional beam for downlink channel transmissions to a user equipment (UE); establishing a uplink directional beam for uplink channel transmissions from the UE; establishing a shared common beam between the base station and the UE; and concurrently controlling or updating: (a) an uplink channel and a downlink channel using the shared common beam, (b) at least two uplink channels using the shared common beam, and/or (c) at least two downlink channels using the shared common beam.

Aspect 2: The method of aspect 1, wherein concurrently controlling or updating each uplink channel and each downlink channel using the shared common beam includes sending a single transmission via the shared common beam to update the UE as to which uplink channel and/or downlink channel should be used by the UE.

Aspect 3: The method of any one of aspects 1 or 2, wherein each downlink channel includes at least one of: a physical downlink control channel (PDCCH), a physical downlink scheduling channel (PDSCH), a channel status information reference signal (CSI-RS), and a positioning reference signal (PRS); and each uplink channel includes at least one of: a physical uplink control channel (PUCCH), a physical uplink scheduling channel (PUSCH), a physical random access channel (PRACH), and a sounding reference signal (SRS).

Aspect 4: The method of any one of aspects 1, 2, or 3, further comprising: allocating the shared common beam to transmit a PUCCH transmission, a PUSCH transmission, or a SRS transmission from the UE to the base station depending on scheduling by a spatial relation information or transmission configuration indicator (TCI), where the shared common beam is used for the PUCCH transmission, the PUSCH transmission, or the SRS transmission if the shared common beam is indicated in the spatial relation information or TCI, otherwise, a default shared common beam is used for the PUCCH transmission, the PUSCH transmission, or the SRS transmission.

Aspect 5: The method of any one of aspects 1, 2, 3, or 4, further comprising: establishing a plurality of shared common beams between the base station and the UE, each shared common beam in the plurality of shared common beams being individually identifiable by a unique beam identifier.

Aspect 6: The method of any one of aspects 1, 2, 3, 4, or 5, further comprising transmitting a message via the shared common beam indicating for the UE to use: a first shared common beam for management of the uplink channel transmissions, and a second shared common beam for management of the downlink channel transmissions.

Aspect 7: The method of any one of aspects 1, 2, 3, 4, 5, or 6, further comprising transmitting a message via the shared common beam indicating for the UE to use: (a) a first shared common beam for uplink and downlink data transmissions, and a second shared common beam for uplink and downlink control transmissions; or (b) a third shared common beam for management of uplink and downlink data channel transmissions, and a fourth shared common beam for management of uplink and downlink control channel transmissions.

Aspect 8: The method of aspect 7, wherein the first shared common beam used for uplink and downlink control channel transmissions has a first beam width, and the second shared common beam used for uplink and downlink data channel transmissions has a second beam width, where the first beam width is wider than the second beam width.

Aspect 9: The method of any one of aspects 1, 2, 3, 4, 5, or 6, further comprising: sending a beam identifier for the shared common beam to the UE using one of: a radio resource control (RRC), medium access control (MAC) control element (CE), or a downlink control indicator (DCI).

Aspect 10: The method of any one of aspects 1, 2, 3, 4, 5, 6, 7, 8, or 9, wherein the shared common beam is assigned a first beam identifier, and the first beam identifier is mapped to at least one of: (a) a downlink beam identifier associated with the downlink directional beam; (b) an uplink beam identifier associated with the uplink directional beam; or (c) a reference signal identifier.

Aspect 11: The method of any one of aspects 1, 2, 3, 4, 5, 6, 7, 8, 9, or 10, further comprising: assigning the shared common beam a beam identifier; associating the beam identifier to a resource group that defines one or more resources utilized between the base station and the UE; and notifying the UE of the resource group associated with the beam identifier; and updating the UE of a change in the resource group by one of either: sending a new beam identifier for a different shared common beam now associated with the resource group, or sending a new resource group identifier associated with the shared common beam.

Aspect 12: The method of any one of aspects 1, 2, 3, 4, 5, 6, 7, 8, 9, 10, or 11, wherein a plurality of component carriers (CCs) are used to transmit one or more channels in each of the downlink directional beam and/or each of the uplink directional beam, and the shared common beam is associated with all of the plurality of CCs.

Aspect 13: The method of any one of aspects 1, 2, 3, 4, 5, 6, 7, 8, 9, 10, 11, or 12, further comprising: maintaining a component carrier (CC) list for bandwidth parts transmitted between the base station and the UE; and associating a beam identifier for the shared common beam with at least one component carrier in the component carrier list.

Aspect 14: The method of any one of aspects 1, 2, 3, 4, 5, 6, 7, 8, 9, 10, 11, 12, or 13, further comprising: transmitting a message to the UE via the shared common channel indicating to the UE to update a shared common beam configuration associated with at least one of the CCs of the list, which causes the UE to use the updated shared common beam configuration for all CCs in the list.

Aspect 15: A base station, comprising: a wireless transceiver; a memory; and a processor communicatively coupled to the wireless transceiver and the memory, wherein the processor and the memory are configured to: establish a downlink directional beam for downlink channel transmissions to a user equipment (UE); establish an uplink directional beam for uplink channel transmissions from the UE; establish a shared common beam between the base station and the UE; and concurrently control or update: (a) an uplink channel and a downlink channel using the shared common beam, (b) at least two uplink channels using the shared common beam, and/or (c) at least two downlink channels using the shared common beam.

Aspect 16: The base station of aspect 15, wherein concurrently controlling or updating each uplink channel and/or each downlink channel using the shared common beam includes sending a single transmission via the shared common beam to update the UE as to which uplink channel and downlink channel should be used by the UE.

Aspect 17: The base station of any one of aspects 15 or 16, wherein each downlink channel includes at least one of: a physical downlink control channel (PDCCH), a physical downlink scheduling channel (PDSCH), a channel status information reference signal (CSI-RS), and a positioning reference signal (PRS); and each uplink channel includes at least one of: a physical uplink control channel (PUCCH), a physical uplink scheduling channel (PUSCH), a physical random access channel (PRACH), and a sounding reference signal (SRS).

Aspect 18: The base station of any one of aspects 15, 16, or 17, wherein the processor and the memory are further configured to send a beam identifier for the shared common beam to the UE using one of: a radio resource control (RRC), medium access control (MAC) control element (CE), or a downlink control indicator (DCI), and the beam identifier is mapped to at least one of: (a) a downlink beam identifier associated with the downlink directional beam; (b) an uplink beam identifier associated with the uplink directional beam; or (c) a reference signal identifier.

Aspect 19: A method for wireless communications at a user equipment (UE), comprising: establishing a downlink directional beam for downlink channel transmissions from a base station; establishing an uplink directional beam for uplink channel transmissions to the base station; establishing a shared common beam between the base station and the UE; and receiving signals, from the base station, within the shared common beam that concurrently control or update: (a) an uplink channel and a downlink channel using the shared common beam, (b) at least two uplink channels using the shared common beam, and/or (c) at least two downlink channels using the shared common beam.

Aspect 20: The method of aspect 19, wherein the receiving signals within the shared common beam includes receiving a single transmission via the shared common beam that update the UE as to which uplink channel and/or downlink channel should be used by the UE.

Aspect 21: The method of any one of aspects 19 or 20, wherein each downlink channel includes at least one of: a physical downlink control channel (PDCCH), a physical downlink scheduling channel (PDSCH), a channel status information reference signal (CSI-RS), and a positioning reference signal (PRS); and each uplink channel includes at least one of: a physical uplink control channel (PUCCH), a physical uplink scheduling channel (PUSCH), a physical random access channel (PRACH), and a sounding reference signal (SRS).

Aspect 22: The method of any one of aspects 19, 20, or 21, further comprising: receiving a PDSCH transmission from the base station to the UE based on a scheduling downlink control indicator (DCI), and depending on whether a scheduling offset between the PDSCH transmission and the scheduling DCI is greater than a predefined threshold, where if the shared common beam is indicated by the scheduling DCI then the shared common beam is used for the PDSCH transmission if the scheduling offset is larger than the predefined threshold, and a default shared common beam is used for the PDSCH transmission otherwise.

Aspect 23: The method of any one of aspects 19, 20, 21, or 22, further comprising: transmitting a PUCCH transmission, a PUSCH transmission, or a SRS transmission from the UE to the base station via the shared common beam depending on scheduling by a spatial relation information or transmission configuration indicator (TCI), where the shared common beam is used for the PUCCH transmission, the PUSCH transmission, or the SRS transmission if the shared common beam is indicated in the spatial relation information or TCI, otherwise, a default shared common beam is used for the PUCCH transmission, the PUSCH transmission, or the SRS transmission.

Aspect 24: The method of any one of aspects 19, 20, 21, 22, or 23, wherein a plurality of shared common beams are established between the base station and the UE, each shared common beam being individually identifiable by a unique beam identifier, and the method further comprising receiving a message via the shared common beam indicating for the UE to use: (a) a first shared common beam for management of the uplink channel transmissions, and a second shared common beam for management of the downlink channel transmissions, or (b) a third shared common beam for uplink and downlink data transmissions, and a fourth shared common beam for uplink and downlink control transmissions.

Aspect 25: The method of any one of aspects 19, 20, 21, 22, 23, or 24, further comprising: receiving a beam identifier for the shared common beam to the UE using one of: a radio resource control (RRC), medium access control (MAC) control element (CE), or a downlink control indicator (DCI).

Aspect 26: The method of any one of aspects 19, 20, 21, 22, 23, or 25, wherein the shared common beam is assigned a first beam identifier, and the first beam identifier is mapped to at least one of: (a) a downlink beam identifier associated with the downlink directional beam; (b) an uplink beam identifier associated with the uplink directional beam; or (c) a reference signal identifier.

Aspect 27: The method of any one of aspects 19, 20, 21, 22, 23, 25, or 26, further comprising: receiving an indication of a beam identifier for the shared common beam, the beam identifier associated with a resource group, wherein the resource group defines one or more resources utilized between the base station and the UE.

Aspect 28: The method of any one of aspects 19, 20, 21, 22, 23, 25, 26, or 28, further comprising: receiving, from the base station, an indication to change a resource group by one of either: receiving a new beam identifier for a different shared common beam now associated with the resource group, or receiving a new resource group identifier associated with the shared common beam.

Aspect 29: A user equipment (UE), comprising: a wireless transceiver; a memory; and a processor communicatively coupled to the wireless transceiver and the memory, wherein the processor and the memory are configured to: establish a downlink directional beam for downlink channel transmissions from a base station; establish an uplink directional beam for uplink channel transmissions to the base station; establish a shared common beam between the base station and the UE; and receive signals, from the base station, within the shared common beam that concurrently control or update: (a) an uplink channel and a downlink channel using the shared common beam, (b) at least two uplink channels using the shared common beam, and/or (c) at least two downlink channels using the shared common beam.

Aspect 30: The UE of aspect 29, wherein the receiving signals within the shared common beam includes receiving a single transmission via the shared common beam that update the UE as to which uplink channel and downlink channel should be used by the UE.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another-even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-11 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2, and 4-11 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communications at a base station, comprising:
 establishing a downlink directional beam for downlink channel transmissions to a user equipment (UE);
 establishing an uplink directional beam for uplink channel transmissions from the UE;
 establishing a shared common beam between the base station and the UE;
 concurrently controlling or updating: (a) an uplink channel and a downlink channel using the shared common beam, (b) at least two uplink channels using the shared common beam, and/or (c) at least two downlink channels using the shared common beam;
 maintaining a component carrier (CC) list for bandwidth parts transmitted in the uplink directional beam and downlink directional beam between the base station and the UE;
 associating a beam identifier for the shared common beam with at least one component carrier (CC) in the component carrier list; and
 transmitting an indication of the beam identifier for the shared common beam, the beam identifier associated with a resource group, wherein the resource group defines one or more resources utilized between the base station and the UE.

2. The method of claim 1, wherein concurrently controlling or updating each uplink channel and each downlink channel using the shared common beam includes
 sending a single transmission via the shared common beam to update the UE as to which uplink channel and/or downlink channel should be used by the UE.

3. The method of claim 1, wherein
 each downlink channel includes at least one of: a physical downlink control channel (PDCCH), a physical downlink scheduling channel (PDSCH), a channel status information reference signal (CSI-RS), and a positioning reference signal (PRS); and
 each uplink channel includes at least one of: a physical uplink control channel (PUCCH), a physical uplink scheduling channel (PUSCH), a physical random access channel (PRACH), and a sounding reference signal (SRS).

4. The method of claim 3, further comprising:
 allocating the shared common beam to transmit a PUCCH transmission, a PUSCH transmission, or a SRS transmission from the UE to the base station depending on scheduling by a spatial relation information or transmission configuration indicator (TCI), where the shared common beam is used for the PUCCH transmission, the PUSCH transmission, or the SRS transmission if the shared common beam is indicated in the spatial relation information or TCI, otherwise, a default shared common beam is used for the PUCCH transmission, the PUSCH transmission, or the SRS transmission.

5. The method of claim 1, further comprising:
 establishing a plurality of shared common beams between the base station and the UE, each shared common beam in the plurality of shared common beams being individually identifiable by a unique beam identifier.

6. The method of claim 1, further comprising:
 transmitting a message via the shared common beam indicating for the UE to use:
 a first shared common beam for management of the uplink channel transmissions, and
 a second shared common beam for management of the downlink channel transmissions.

7. The method of claim 1, further comprising:
 transmitting a message via the shared common beam indicating for the UE to use:
 (a) a first shared common beam for uplink and downlink data transmissions, and a second shared common beam for uplink and downlink control transmissions; or
 (b) a third shared common beam for management of uplink and downlink data channel transmissions, and a fourth shared common beam for management of uplink and downlink control channel transmissions.

8. The method of claim 7, wherein the first shared common beam used for uplink and downlink data channel transmissions has a first beam width, and the second shared common beam used for uplink and downlink control channel transmissions has a second beam width, where the first beam width is wider than the second beam width.

9. The method of claim 1, further comprising:
 sending the beam identifier for the shared common beam to the UE using one of: a radio resource control (RRC), medium access control (MAC) control element (CE), or a downlink control indicator (DCI).

10. The method of claim 1, wherein the shared common beam is assigned a first beam identifier, and the first beam identifier is mapped to at least one of:
 (a) a downlink beam identifier associated with the downlink directional beam;
 (b) an uplink beam identifier associated with the uplink directional beam; or
 (c) a reference signal identifier.

11. The method of claim 1, further comprising:
 assigning the shared common beam the beam identifier;
 associating the beam identifier to the resource group that defines one or more resources utilized between the base station and the UE; and
 notifying the UE of the resource group associated with the beam identifier; and
 updating the UE of a change in the resource group by one of either:
 sending a new beam identifier for a different shared common beam now associated with the resource group, or
 sending a new resource group identifier associated with the shared common beam.

12. The method of claim 1, wherein a plurality of component carriers (CCs) are used to transmit one or more channels in each of the downlink directional beam and/or each of the uplink directional beam, and the shared common beam is associated with all of the plurality of CCs.

13. A base station, comprising:
a wireless transceiver;
a memory; and
a processor communicatively coupled to the wireless transceiver and the memory, wherein the processor is configured to:
  establish a downlink directional beam for downlink channel transmissions to a user equipment (UE);
  establish an uplink directional beam for uplink channel transmissions from the UE;
  establish a shared common beam between the base station and the UE;
  concurrently control or update: (a) an uplink channel and a downlink channel using the shared common beam, (b) at least two uplink channels using the shared common beam, and/or (c) at least two downlink channels using the shared common beam;
  maintain a component carrier (CC) list for bandwidth parts transmitted in the uplink directional beam and downlink directional beam between the base station and the UE;
  associate a beam identifier for the shared common beam with at least one component carrier in the component carrier list; and
  transmit an indication of the beam identifier for the shared common beam, the beam identifier associated with a resource group, wherein the resource group defines one or more resources utilized between the base station and the UE.

14. The base station of claim 13, wherein concurrently controlling or updating each uplink channel and/or each downlink channel using the shared common beam includes sending a single transmission via the shared common beam to update the UE as to which uplink channel and downlink channel should be used by the UE.

15. The base station of claim 13, wherein
each downlink channel includes at least one of: a physical downlink control channel (PDCCH), a physical downlink scheduling channel (PDSCH), a channel status information reference signal (CSI-RS), and a positioning reference signal (PRS); and
each uplink channel includes at least one of: a physical uplink control channel (PUCCH), a physical uplink scheduling channel (PUSCH), a physical random access channel (PRACH), and a sounding reference signal (SRS).

16. The base station of claim 13, wherein the processor is further configured to:
send the beam identifier for the shared common beam to the UE using one of: a radio resource control (RRC), medium access control (MAC) control element (CE), or a downlink control indicator (DCI), and the beam identifier is mapped to at least one of:
(a) a downlink beam identifier associated with the downlink directional beam;
(b) an uplink beam identifier associated with the uplink directional beam; or
(c) a reference signal identifier.

17. A method for wireless communications at a user equipment (UE), comprising:
establishing a downlink directional beam for downlink channel transmissions from a base station;
establishing an uplink directional beam for uplink channel transmissions to the base station;
establishing a shared common beam between the base station and the UE, wherein a plurality of component carriers (CCs) are used to transmit one or more channels in each of the downlink directional beam and/or each of the uplink directional beam, and the shared common beam is associated with all of the plurality of CCs;
receiving signals, from the base station, within the shared common beam that concurrently control or update: (a) an uplink channel and a downlink channel using the shared common beam, (b) at least two uplink channels using the shared common beam, and/or (c) at least two downlink channels using the shared common beam; and
receiving an indication of a beam identifier for the shared common beam, the beam identifier associated with a resource group, wherein the resource group defines one or more resources utilized between the base station and the UE.

18. The method of claim 17, wherein the receiving signals within the shared common beam includes
receiving a single transmission via the shared common beam that update the UE as to which uplink channel and/or downlink channel should be used by the UE.

19. The method of claim 17, wherein
each downlink channel includes at least one of: a physical downlink control channel (PDCCH), a physical downlink scheduling channel (PDSCH), a channel status information reference signal (CSI-RS), and a positioning reference signal (PRS); and
each uplink channel includes at least one of: a physical uplink control channel (PUCCH), a physical uplink scheduling channel (PUSCH), a physical random access channel (PRACH), and a sounding reference signal (SRS).

20. The method of claim 17, further comprising:
receiving a PDSCH transmission from the base station to the UE based on a scheduling downlink control indicator (DCI), and depending on whether a scheduling offset between the PDSCH transmission and the scheduling DCI is greater than a predefined threshold, where if the shared common beam is indicated by the scheduling DCI then the shared common beam is used for the PDSCH transmission if the scheduling offset is larger than the predefined threshold, and a default shared common beam is used for the PDSCH transmission otherwise.

21. The method of claim 17, further comprising:
transmitting a PUCCH transmission, a PUSCH transmission, or a SRS transmission from the UE to the base station via the shared common beam depending on scheduling by a spatial relation information or transmission configuration indicator (TCI), where the shared common beam is used for the PUCCH transmission, the PUSCH transmission, or the SRS transmission if the shared common beam is indicated in the spatial relation information or TCI, otherwise, a default shared common beam is used for the PUCCH transmission, the PUSCH transmission, or the SRS transmission.

22. The method of claim 17, wherein a plurality of shared common beams are established between the base station and the UE, each shared common beam being individually identifiable by a unique beam identifier, and the method further comprising:
receiving a message via the shared common beam indicating for the UE to use:
(a) a first shared common beam for management of the uplink channel transmissions, and a second shared common beam for management of the downlink channel transmissions, or (b) a third shared common beam for uplink and downlink data transmissions, and a fourth shared common beam for uplink and downlink control transmissions.

23. The method of claim 17, further comprising:
receiving the beam identifier for the shared common beam to the UE using one of: a radio resource control (RRC), medium access control (MAC) control element (CE), or a downlink control indicator (DCI).

24. The method of claim 17, wherein the shared common beam is assigned a first beam identifier, and the first beam identifier is mapped to at least one of:
  (a) a downlink beam identifier associated with the downlink directional beam;
  (b) an uplink beam identifier associated with the uplink directional beam; or
  (c) a reference signal identifier.

25. The method of claim 17, further comprising:
receiving, from the base station, an indication to change a resource group by one of either:
  receiving a new beam identifier for a different shared common beam now associated with the resource group, or
  receiving a new resource group identifier associated with the shared common beam.

26. A user equipment (UE), comprising:
a wireless transceiver;
a memory; and
a processor communicatively coupled to the wireless transceiver and the memory, wherein the processor is configured to:
  establish a downlink directional beam for downlink channel transmissions from a base station;
  establish an uplink directional beam for uplink channel transmissions to the base station;
  establish a shared common beam between the base station and the UE, wherein a plurality of component carriers (CCs) are used to transmit one or more channels in each of the downlink directional beam and/or each of the uplink directional beam, and the shared common beam is associated with all of the plurality of CCs;
  receive signals, from the base station, within the shared common beam that concurrently control or update: (a) an uplink channel and a downlink channel using the shared common beam, (b) at least two uplink channels using the shared common beam, and/or (c) at least two downlink channels using the shared common beam; and
  receive an indication of a beam identifier for the shared common beam, the beam identifier associated with a resource group, wherein the resource group defines one or more resources utilized between the base station and the UE.

27. The UE of claim 26, wherein the receiving signals within the shared common beam includes
receiving a single transmission via the shared common beam that update the UE as to which uplink channel and downlink channel should be used by the UE.

* * * * *